(12) United States Patent
Mackay Pett

(10) Patent No.: US 11,891,311 B2
(45) Date of Patent: Feb. 6, 2024

(54) PROCESS AND SYSTEM FOR BACK-AND-FORTH WASHING OF ADSORPTIVE MEDIA

(71) Applicant: OZONO POLARIS, S.A. DE C.V., Puebla (MX)

(72) Inventor: David Ross Mackay Pett, Puente (MX)

(73) Assignee: Ozono Polaris, S.A. de C.V., Puebla (MX)

(*) Notice: Subject to any disclaimer, the term of this patent is extended or adjusted under 35 U.S.C. 154(b) by 154 days.

(21) Appl. No.: 17/130,487

(22) Filed: Dec. 22, 2020

(65) Prior Publication Data

US 2021/0261440 A1 Aug. 26, 2021

Related U.S. Application Data

(62) Division of application No. 16/229,557, filed on Dec. 21, 2018, now Pat. No. 10,906,818.

(Continued)

(51) Int. Cl.
*C02F 1/28* (2023.01)
*B01D 29/68* (2006.01)
(Continued)

(52) U.S. Cl.
CPC .............. *C02F 1/281* (2013.01); *B01D 29/68* (2013.01); *C02F 1/283* (2013.01); *B01J 20/08* (2013.01); *B01J 20/18* (2013.01); *B01J 20/20* (2013.01); *B01J 20/3408* (2013.01); *B01J 20/3416* (2013.01); *B01J 20/3433* (2013.01); *B01J 20/3475* (2013.01); *C02F 1/76* (2013.01); *C02F 1/78* (2013.01); *C02F 2303/04* (2013.01); *C02F 2303/06* (2013.01)

(58) Field of Classification Search
None
See application file for complete search history.

(56) References Cited

U.S. PATENT DOCUMENTS 3,482,695 A 12/1969 Hansen et al.
3,810,544 A 5/1974 Armstrong et al.
(Continued)

FOREIGN PATENT DOCUMENTS

CA 2532293 A1 7/2007
CN 202277981 6/2012
(Continued)

OTHER PUBLICATIONS

Passuello, Problems Associated with Ozone/GAC as the Final Disinfectant, 64th Annula Water Engineers and Operators Conference, All Seasons International Hotel—Bendigo, Sep. 2001 [Retrieved on Jun. 28, 2019]. Retrieved from the Internet: <U RL:http://www.wioa.org .au/conference_papers/2001 /pdf/paper2. pdf> . . . (Year: 2001).

(Continued)

*Primary Examiner* — Chester T Barry
(74) *Attorney, Agent, or Firm* — Heslin Rothenberg Farley & Mesiti, P.C.

(57) ABSTRACT

The invention provides methods and systems for washing adsorptive media with minimal water consumption. More specifically, the invention provides methods and systems for in situ regeneration and/or sanitization of adsorptive media, such as activated carbon, using back-and-forth washing.

20 Claims, 7 Drawing Sheets

Related U.S. Application Data

(60) Provisional application No. 62/720,376, filed on Aug. 21, 2018.

(51) Int. Cl.

| | |
|---|---|
| *C02F 1/78* | (2023.01) |
| *B01J 20/34* | (2006.01) |
| *B01J 20/18* | (2006.01) |
| *B01J 20/20* | (2006.01) |
| *B01J 20/08* | (2006.01) |
| *C02F 1/76* | (2023.01) |

(56) References Cited

U.S. PATENT DOCUMENTS

| | | | |
|---|---|---|---|
| 3,927,175 | A | 12/1975 | Garofano et al. |
| 3,932,278 | A | 1/1976 | Meidl et al. |
| 4,076,625 | A | 2/1978 | Scholten et al. |
| 4,080,287 | A | 3/1978 | Conway et al. |
| 4,157,962 | A | 6/1979 | Huang et al. |
| 4,322,299 | A | 3/1982 | Scholten et al. |
| 4,693,831 | A | 9/1987 | Garzonetti |
| 4,694,179 | A | 9/1987 | Lew et al. |
| 4,766,321 | A | 8/1988 | Lew et al. |
| 4,786,418 | A | 11/1988 | Garg et al. |
| 4,792,407 | A | 12/1988 | Zeff et al. |
| 4,861,484 | A | 8/1989 | Lichtin et al. |
| 4,959,142 | A | 9/1990 | Dempo |
| 5,190,659 | A | 3/1993 | Wang et al. |
| 5,236,595 | A | 8/1993 | Wang et al. |
| 5,244,585 | A | 9/1993 | Sugimoto |
| 5,256,299 | A | 10/1993 | Wang et al. |
| 5,403,480 | A | 4/1995 | Sugimoto |
| 5,466,367 | A | 11/1995 | Coate et al. |
| 5,707,528 | A | 1/1998 | Berry |
| 5,756,054 | A | 5/1998 | Wong et al. |
| 5,756,721 | A | 5/1998 | Eden et al. |
| 5,863,433 | A * | 1/1999 | Behrends ............... C02F 3/327 210/150 |
| 5,882,588 | A | 3/1999 | Laberge |
| 5,904,832 | A | 5/1999 | Clifford et al. |
| 5,928,516 | A | 7/1999 | Hopkins et al. |
| 6,027,642 | A | 2/2000 | Prince et al. |
| 6,245,242 | B1 | 6/2001 | Schuster et al. |
| 6,673,248 | B2 | 1/2004 | Chowdhury |
| 7,037,871 | B1 | 5/2006 | Galperin et al. |
| 7,267,710 | B2 | 9/2007 | Tatsuhara et al. |
| 7,491,337 | B2 | 2/2009 | Karaman |
| 8,293,669 | B2 | 10/2012 | Kirkpatrick |
| 8,318,027 | B2 | 11/2012 | McGuire et al. |
| 8,323,514 | B2 | 12/2012 | Geibel et al. |
| 9,375,663 | B2 | 6/2016 | Ozono |
| 9,580,335 | B2 | 2/2017 | Felch et al. |
| 2006/0213834 | A1 | 9/2006 | Kando et al. |
| 2007/0158278 | A1 | 7/2007 | Deschenes |
| 2009/0261042 | A1 | 10/2009 | Semiat et al. |
| 2010/0292844 | A1 | 11/2010 | Volf |
| 2011/0042236 | A1 | 2/2011 | Kim et al. |
| 2013/0220913 | A1 | 8/2013 | Cohen et al. |
| 2017/0216777 | A1 | 8/2017 | Aketagawa et al. |
| 2017/0313598 | A1 | 11/2017 | Mackay Pett |

FOREIGN PATENT DOCUMENTS

| | | |
|---|---|---|
| CN | 102416392 B | 6/2013 |
| CN | 203459323 | 3/2014 |
| CN | 204022603 U | 12/2014 |
| CN | 103394483 B | 10/2016 |
| CN | 106110895 A | 11/2016 |
| CN | 107445340 A | 12/2017 |
| EP | 1038840 A2 | 9/2000 |
| EP | 2777803 A1 | 9/2014 |
| EP | 3159314 A1 | 10/2016 |
| JP | S5929008 A | 2/1984 |
| JP | 3841735 B2 | 11/2006 |
| JP | 6416007 B2 | 2/2014 |
| JP | 2014064976 A | 4/2014 |
| KR | 20050024489 A | 3/2005 |
| KR | 101117748 B1 | 3/2012 |
| KR | 101427797 B1 | 10/2014 |
| KR | 101744400 B1 | 6/2017 |
| WO | 2008135920 A2 | 11/2008 |

OTHER PUBLICATIONS

Environmental Protection Agency, Drinking Water Treatability Database, Ozone, Oct. 2011 [Retrieved on Jun. 28, 2019]. Retrieved from the Internet: <URL: https ://iaspub .epa .gov/tdb/pages/treatment/treatmentOverview .do?treatmentProcess Id =-146763683 7>. (Year: 2011).

Echeng Lei et al.; "Catalytic Oxidation of Highly Concentrated Real Industrial Wastewater by Integrated Ozone and Activated Carbon"; ScienceDirect Applied Catalysis A: General 327 (2007) 287-294; Elsevier Science Ltd.; Hangzhou, PR China.

M. L. Bao et al.; "Removal of Bromate Ion from Water Using Granular Activated Carbon"; Pergamon (1999) vol. 33, No. 13, pp. 2959-2970; Elsevier Science Ltd.; Florence, Italy.

Xuexiang He et al.; "Ozone Regeneration of Granular Activated Carbon for Trihalomethane Control"; ScienceDirect Journal of Hazardous Materials 326 (2017) 101-109; Elsevier Science Ltd.; United States.

Microbubble-based membrane cleaning process downloaded from http://a1f.262.myftpupload.com/microbubble-based-membrane-cleaning-process/; downloaded on Jun. 13, 2018.

Mitsubishi Electric to Field Test Ozone Backwashing Energy-Saving Membrane Bioreactor in Singapore; Publication date of Jul. 11, 2016; Mitsubishi Electric Corporation Public Relations Division 7-3, Marunouchi 2-chome, Chiyoda-ku, Tokyo, 100-8310 Japan; No. 3033.

Melin, E .; Eikebrokk, B .; Brugger, M .; Odegaard, H .; Treatment of Humic Surface Water at Cold Temperatures by Ozonation and Biofiltration, Water Science & Technology Water Supply, 2(5): 451-457 (Dec. 2002.

International Search Report and Written Opinion issued in PCT/IB2015/054158, dated Oct. 16, 2015.

International Search Report of the International Searching Authority for PCT/IB2018/060542 dated Apr. 25, 2019.

* cited by examiner

PROCESS AND SYSTEM FOR BACK-AND-FORTH WASHING OF ADSORPTIVE MEDIA

CROSS REFERENCE TO RELATED APPLICATION

This application claims priority to U.S. pending application Ser. No. 16/229,557, filed on Dec. 21, 2018, which claims priority to U.S. Provisional Application No. 62/609,739, filed on Dec. 22, 2017, and U.S. Provisional Application No. 62/720,376, filed on Aug. 21, 2018. The entire contents of each of the aforementioned applications are hereby incorporated herein by reference.

FIELD OF THE INVENTION

The present invention relates generally to water treatment systems that use adsorptive media, and, more particularly, to water treatment systems that utilize granular or powdered activated carbon.

BACKGROUND

The present invention reduces the water consumption and improves the effectiveness of in situ regeneration, and optionally sanitization, of granular porous filter media, such as activated carbon. The embodiments disclosed herein can also be applied to powdered adsorptive or adsorbent materials, such as a powdered activated carbon slurry.

Among other things, the disclosure herein is a novel and nonobvious improvement to the invention previously disclosed in U.S. Pat. No. 9,375,663, which is incorporated herein in its entirety by reference.

Activated carbon (whether granular or in powder form) has been used for thousands of years to remove color, taste and odor from water by adsorbing organic contaminants. During the past century adsorptive natural and synthetic zeolites have come into use to purify water by ion exchange. The earliest water softeners used natural zeolite to remove the calcium and magnesium cations that constitute water hardness. More efficient synthetic zeolites were later developed to filter these and other target contaminants from water.

In recent years the level of trace contaminants in our water supplies has become an increasing health concern, and new limits have been set for their maximum contaminant levels. The category known as 'emerging contaminants' includes pharmaceuticals, personal care products, pesticides, herbicides and endocrine disrupting compounds, most of which can be filtered by activated carbon. In 2003, the United States Environmental Protection Agency, Office of Water, named activated carbon (often in conjunction with aeration) as the best available technology for removing most of these contaminants. Furthermore, it has become increasingly necessary to treat wastewater for reuse, especially in arid regions. Activated carbon filtration is often a critical step in the treatment train for this application.

It is known that while the initial investment for activated carbon filters is low compared to reverse osmosis (RO) systems, for example, the operating cost can be quite high. The present invention substantially reduces the operating cost by lowering water consumption, improving the effectiveness of regeneration, and optionally sanitization, of the porous filter media and thereby prolonging the useful life of the media.

Granular activated carbon (GAC), when used to purify potable or process water, tends to harbor bacteria which grow on the granular media. These bacteria can form a slime which interferes with the filtration and can slough off the granules thereby contaminating the effluent water, occasionally causing the product water to be of worse quality than the feed water. This is usually combatted by steaming the filter bed periodically, or chemically sanitizing the bed with acid, caustic or peroxide to kill the bacteria. The sanitization sequence can take a full day and, especially in warmer climates that favor bacterial growth, may be needed every few days.

Freshly activated (or regenerated) carbon is very efficient at removing contaminants from the water stream but, within a few weeks in service, that efficiency deteriorates significantly. Offsite thermal regeneration in specialized furnaces typically costs about 70% of the cost of virgin carbon and about 10% of the carbon is lost in the process. If the carbon can keep the effluent quality within acceptable (though non-optimal) limits for several months, it is common for facilities to dispose of the used or spent carbon (problematic in itself due to the adsorbed, often toxic contaminants) and replace it with fresh carbon.

When physical cleaning of a filter bed becomes necessary, backwashing is typically employed whereby clean water is forced upward through the media. The upward flow of water through the filter bed causes the particles to fluidize, or become suspended in the fluid flow, when sufficiently high flow rates are employed. At least partial fluidization of the particles contained within a filter bed can be achieved during a backwashing stage using a sufficient flow rate. However, backwashing consumes considerable water and produces large volumes of backwash effluent. Backwash effluent may be recycled to the front of a treatment process provided entrained contaminants will not incapacitate the treatment; otherwise the backwash effluent must be sent to waste. Similarly, backwashing with a wash fluid containing a disinfectant could control bacterial growth, but prolonged washing is required to disinfect adsorptive filter media, and the disinfectant may make recycling of the backwash effluent inviable. And, when backwashing is used to remove toxic contaminants, the contaminants found in the backwash effluent are often times returned to the environment.

Processes for regenerating exhausted activated carbon back to its partial or full adsorptive capacity using chemical solutions are known in the art. However, while economically attractive, chemical regeneration processes have not had much success, at least in part because until now a practical means to dynamically scrub (or wash/clean) adsorbent/adsorptive media with chemicals in situ over a prolonged period of time without excessive water and chemical consumption was not available. Similarly, while backwashing granular filter media with ozonated water is effective in regenerating and/or sanitizing the granular media, the water consumption required to maintain the filter bed in a fully fluidized condition, over a period sufficient for the ozone to provide the desired effect, can be excessive.

Powdered activated carbon (PAC) is widely used in potable water treatment to remove taste, odor and color compounds, and in wastewater treatment to remove organic compounds. The carbon is added to the water as a powder or slurry, mixed and given time to adsorb the contaminants, then either removed as a settled slurry or in the backwash water of a filter. Backwashing powdered activated carbon is not feasible as any overflow would carry with it the powdered carbon in suspension. For this reason, powdered activated carbon is rarely regenerated and is generally disposed as a solid waste.

The present invention addresses these issues by utilizing back-and-forth flow of wash water, with or without pulsed fluidization of a filter bed. As disclosed herein, water consumption can be significantly reduced by cycling all or part of the wash water using the new and nonobvious back-and-forth method described herein.

In filtration systems, for example, previous attempts to recycle backwash by recirculating it from the top of the filter back to the wash water inlet at the bottom of the filter have been unsuccessful for several reasons. For one, filter underdrain nozzles typically have wedge-shaped slots arranged in a cylindrical form (i.e. cylinder), or similar type constructions, wherein the outside of the nozzles comprises narrow slots that provide sufficient spacing for filtered water to flow through the nozzles while preventing filter bed particles from passing therethrough. A wedge-shaped geometry optimizes this process so that during normal filtration flow the filter media particles are excluded from entering the underdrain as water flows into the cylindrical nozzles and the slots of the nozzles then widen to limit any fine particles from getting stuck within the slots.

However, when a filter bed is backwashed in a direction counter (or opposite) to that of the filtration flow direction, the used backwash water exiting (or discharged from) the top of the filter bed contains a high quantity of fine particles or particulate material from the agitated filter media. In certain configurations (for example, when automatic cleaning systems or devices are not available), attempts to recirculate used backwash water containing a high content of fine particles into the filter underdrain and back through the wedge-shaped nozzles (in a flow direction that is counter to or the reverse of the normal filtration flow direction) may be hindered as the backwash enters the inner wider side of the wedge-shaped nozzles and then through the narrowing slots in a flow direction counter to the normal filtration flow, thus trapping the fine particles and clogging the underdrain nozzles. Accordingly, while not required, one object of this invention to provide a novel, improved method of regenerating and/or sanitizing adsorptive granular filter media which reduces wash water demand and overcomes the deficiencies of recirculating backwash effluent as described above.

Even when clogging during the recirculating of backwash effluent is not an issue, it is a further object of this invention is to provide a novel, improved multi-step method of regenerating and/or sanitizing granular filter media to maintain the treatment effectiveness (e.g. adsorptive capacity) thereof and allow prolonged use within a filter bed without excessive water consumption or substantial downtime for the water filtration/treatment system.

Furthermore, dissolved ozone (and other oxidants, such as chlorine, hydrogen peroxide or permanganate), may penetrate only a short distance into a static filter bed before being consumed. This has limited the ability to use certain oxidants for in situ regeneration and/or sanitization. As such, in certain embodiments (although not required) it is an object of this invention to achieve improved regeneration and sanitization efficiency of adsorptive granular filter media with an improved method of employing dissolved ozone to separate contaminants from the surface of the granular media by briefly and repeatedly fluidizing the filter media to renew the layer of media at the level in the bed where oxidant is introduced. This method also avoids the oxidants from contacting directly with the body of the filter, which may be susceptible to oxidation. In still other embodiments, improvements in regenerating and/or disinfecting both cationic and anionic exchange resins are provided. More specifically, cationic ion exchange resins are largely unaffected by periodic exposure to disinfectants like chlorine and ozone, but the exposure time and agitation required for effective disinfection has limited its application. With the back-and-forth flow method and system disclosed herein, these problems can be addressed. Similarly, currently the available anionic resins do not resist oxidants such as chlorine and ozone well, but they can be cleaned with back and forth flow of non-oxidizing chemicals as described herein.

When powdered activated carbon is used as an adsorptive media, it is a further object of this invention to provide a practical means of regenerating and reutilizing the activated carbon, thereby reducing the production of solid waste.

The present invention solves or mitigates these and other deficiencies in the art by using back-and-forth flow between two filters, or between one filter and a holding tank, or between two washers, to wash the adsorptive media, thereby allowing the adsorptive media to be treated for a sufficient amount of time to achieve the desired regeneration and/or sanitization with minimum usage or consumption of water and/or chemicals.

The method disclosed herein is simple, cost efficient and highly effective, and prolongs the operating time ("life") of fixed-bed filters by allowing one to either completely, substantially or partially eliminate bacteria that is present in the filter media, to avoid uncontrolled growth thereof, and either completely, substantially or partially regenerate the adsorptive capacity of the filter media, all while consuming minimal amounts of water and/or treatment chemicals.

Further objectives are to provide an in-situ method that offers an economical alternative to media replacement and conventional sanitization/regeneration methods that does not a) require shut-down of the filtration or other water treatment system for a substantial, extended length of time; b) discharge large amounts of backwash or wash effluent to drain following treatment; and/or c) produce contaminated backwash effluent.

SUMMARY

Embodiments of the present invention provide a method for washing an adsorptive medium within a water treatment system, comprising the steps of providing a first and a second vessel, wherein the first vessel is configured to contain the adsorptive medium to be regenerated, and wherein the second vessel is in fluid communication with the first vessel; and performing a washing stage with a wash fluid by cycling, a flow of the wash fluid between the first and second vessel in a first and second flow direction to produce a back-and-forth flow of the wash fluid through the adsorptive medium, wherein the back-and-forth flow of the wash fluid between the first and second vessel is performed for a sufficient number of cycles and a time period sufficient to at least partially regenerate the adsorptive medium, thereby producing a processed wash fluid; and stopping the back-and-forth flow of the processed wash fluid between the first and second vessel; and performing a step selected from the group comprising draining the processed wash fluid from the first vessel, draining the processed wash fluid from the second vessel, flushing the first vessel, flushing the second vessel, discharging the processed wash fluid to waste, neutralizing the processed wash fluid, treating the processed wash fluid to generate at least one additional wash fluid for reuse, rinsing the adsorptive medium, returning to filtration flow, and combinations thereof. The at least first and second vessels may be configured as filters, holding tanks or external washers. The adsorptive medium may comprise granular or powered activated carbon.

In still other embodiments, the method comprises a first and/or second flow rate sufficient to at least partially fluidize the adsorptive medium, and may further comprise the step of pulsed fluidization to renew the bottom portion of a filter bed to be treated, the top portion of the filter bed to be treated, or both the top and bottom portions of the filter bed to be treated. In other embodiments, the method comprises the steps of periodically pulsing the flow of the wash fluid into the filter bed to be treated at a predetermined minimum fluidization velocity to homogenize the adsorptive medium; introducing ozone or a dissolved ozone solution into the filter bed to be treated; and contacting the adsorptive medium with the ozone or dissolved ozone solution.

Still other embodiments include a water treatment system comprising at least a first and a second vessel, wherein the first vessel is configured to contain an adsorptive medium to be regenerated, and wherein the second vessel is in fluid communication with the first vessel; and wherein the system is configured to perform a washing stage with a wash fluid by cycling a flow of the wash fluid between the first and second vessel in a first and second flow direction to produce a back-and-forth flow of the wash fluid through the adsorptive medium, and is further configured to provide for the back-and-forth flow of the wash fluid between the first and second vessel to continue for a sufficient number of cycles and a time period sufficient to at least partially regenerate the adsorptive medium. The at least first and second vessels may be configured as filters, holding tanks or external washers. The adsorptive medium may comprise granular or powered activated carbon.

DETAILED DESCRIPTION

Figure 1:
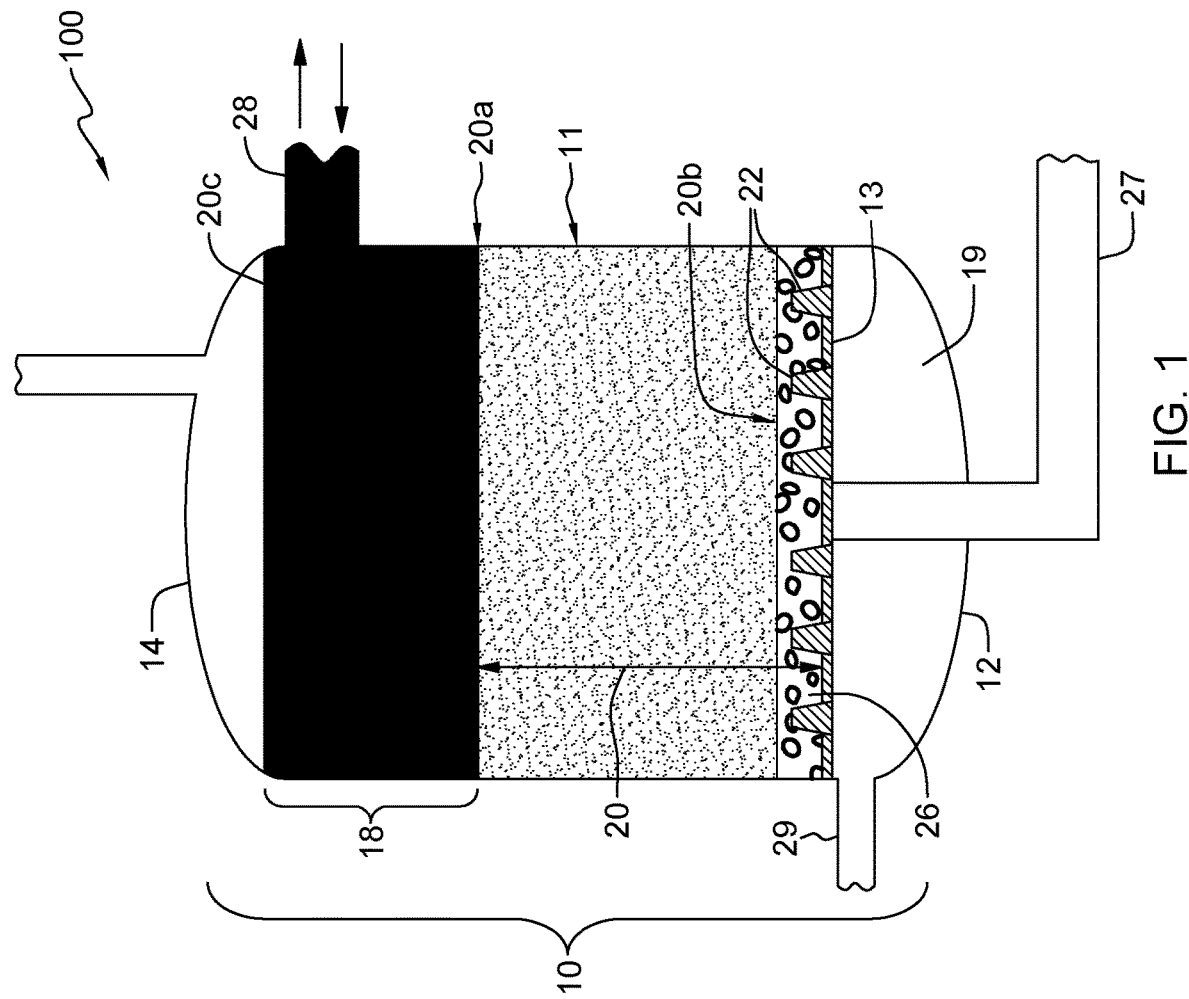
FIG. 1 is a schematic representation of a filter that can be utilized in one embodiment of the improved system and method described herein.

The present invention may address one or more of the problems and deficiencies of the art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

The term "backwash" or "backwashing" refers to the process of reversing the flow of a fluid back through a filter bed to remove contaminants or other non-adsorbed particles. Backwash flow (i.e. the flow direction of a backwash fluid stream) is by definition counter-current to filtration flow (or in the opposite direction thereof). "Backwashing" may also be referred to as "backflushing."

The term "activated carbon" refers to adsorptive carbon particles or granules having a large surface area and a high internal porosity, usually obtained by heating a variety of carbon sources. For purposes of this disclosure, "activated carbon" may also be referred to as "carbon" or "active carbon."

The term "granular activated carbon" (also known as GAC or "granulated" activated carbon) refers to activated carbon with a particle size ranging from about 0.2 to 5 mm.

The term "powdered activated carbon" (also known as PAC or "powder" activated carbon) refers to activated carbon with a particle size less than 0.2 mm.

The term "exhausted activated carbon" refers to activated carbon that has been depleted in its adsorption capacity. "Exhausted activated carbon" may also be referred to as "spent" or "depleted" activated carbon.

The term 'filter' may refer to any vessel containing adsorptive granular media that is configured to retain contaminants from contaminated water flowing through it during filtration flow.

The term "ozone," or trioxygen, refers to the triatomic form of oxygen, an inorganic molecule with the chemical formula $OO_2$ or $O_3$ or $O_3$.

The term "ozonated" describes a medium, compound, substance or liquid (e.g. water) that has been infused or impregnated with ozone. "Ozonated" may also be referred to as "ozonized." Similarly, the term "ozonation" refers to the treatment or combination of a substance or compound with ozone.

The term "air scour" refers to a process where streams of air are forced upward through the medium, usually in combination with the backwash flow, to assist in fluidization of the filter bed.

The term "regeneration" or "regenerate" refers to the removal of molecules adsorbed onto the surface of an adsorbent filter media to partially, substantially or completely restore the media to its original adsorptive capacity.

The term "reduced adsorptive capacity" refers to an adsorptive capacity less than a porous filter media's original, or native, adsorptive capacity.

The term "fluidization" refers to a process in which a gas or liquid is passed through filter media at a sufficient flow rate (i.e. fluidizing flow rate) and with sufficient force to cause the particles within the filter to separate and to act as a fluid. In this way, fluidization converts the granules or particles within the filter media from a static solid-like state to a dynamic fluid-like state such that the particles are suspended in the fluidizing flow and become agitated and/or reorganized.

The term "sanitization" or "sanitize" refers to the process of reducing the number of organisms or pathogens that endanger public health so as to reduce the microbial population to a safe level as determined by public health standards. In accordance with this application, sanitizing does not require complete elimination or destruction of all bacteria, but only near elimination. By way of example only, in some embodiments, "sanitization" refers to a reduction in organism or pathogen count of at least 99% (e.g., at least 99.5% or at least 99.9%).

The term "pulsed" or "pulsing" fluidization refers to a technique used for fluidizing a filter bed which is characterized by intermittent short duration pulses of a fluidizing flow of a gas or liquid through a filter bed (i.e. the fluidizing flow is turned "on" and "off").

The term "sequence" refers to a complete wash sequence, from when the filter is taken out of service for washing until it is ready to be returned to service. A wash sequence will be comprised of one or more stages.

The term "stage" or "stages" refers to one or more distinct wash fluids or treatment solutions within a wash sequence, wherein each stage comprises one or more back and forth flow cycles. Between stages, the one or more distinct wash fluids or treatment solutions may be flushed, drained, or neutralized in preparation for the next stage.

The term "cycle" comprises one back and forth flow cycle, possibly including one or more steps including but not limited to a flow reversal step, change in flow rate step (i.e. to create pulsed fluidization), a treatment step, or a step that introduces an air scour.

The method of regenerating and/or sanitizing an adsorptive medium according to this invention is illustrated with reference to the figures. In FIG. 1, certain features of a typical porous, granular medium filter construction within a water filtration system in accordance with the invention are shown in partial cross-section. The filter shown here is merely representative of filters adaptable to the regenerating and/or sanitizing methods according to the present invention, and is not meant to be limiting.

Referring to FIG. 1, a filter 100 (or filter vessel, filter element, or filtration tank) includes a cylindrical vessel 10 having sidewalls 11, a bottom wall 12 and top wall 14. In embodiments described herein, FIG. 1 is configured as a pressure filter comprising porous filter media to form filter bed 20. However, in accordance with the invention, other alternative tank configurations may be used and is a matter of design choice and/or system operation, as is known in the art.

Vessel or tank 10 can be any practical size, i.e. ranging in diameter from about 0.2 m (½ foot) to about 3.0 m (10 feet), and the volume of porous filter medium comprising filter bed 20 in vessel 10 may have a range of about 20 liters to about 50,000 liters (about 1-1500 cubic feet), including all ranges and subranges therein, limited only by practical considerations in the mechanical construction of the vessel. In embodiments discussed herein, vessel 10 has a length (or straight height) of about 2.25 meters (m). In alternate embodiments, vessel 10 has a length (or straight height) in the range of about 0.5 m to about 10 m, including all ranges and subranges therein.

A generally horizontal member, herein referred to as an underdrain support means 13, is mounted within tank 10 adjacent to and substantially parallel to the bottom wall 12. Underdrain support means 13 is configured to support an overlying filter bed 20 composed of granular filter media (sometimes referred to herein "granular media", "filter media" or "porous filter media"). The granular media can be composed of various materials of various grain sizes. For purposes of this disclosure, granular filter media can be selected from the group comprising activated carbon, activated alumina, zeolite, manganese green sand, synthetic magnesium silicate, sand, anthracite, ion exchange resins, and combinations thereof. It can be composed either of a single material or two or more different stratified materials. For example, optionally, filter 100 may also comprise gravel 26 at the bottom of the filter bed in and around nozzles 22.

Although not meant to be limiting, in certain embodiments, underdrain support means 13 may comprise one or more of the following: a false bottom (i.e. blocks), a screen, horizontal plate, lateral pipes, or a horizontally disposed header. The underdrain receptacle or chamber 19 below the underdrain support means 13 comprises an open chamber extending horizontally beneath the filter bed 20 and is configured to receive the filtered water flowing through the filter bed 20 in the direction of filtration flow. As is known in the art, wastewater systems typically include an underdrain configuration for supporting filter media such that the filter media is separated from the bottom of the filter. In addition to providing support for the filter media, the underdrain configuration provides for a means to collect the filtered water that passes through the filter and to uniformly distribute wash/backwash water, air, or a combination of both, across the bottom surface of the filter bed.

As shown in FIG. 1, underdrain support means 13 includes a plurality of underdrain nozzles 22 which extend through support means 13 and are configured to operate both as (a) drainage ports, wherein the drainage ports allow filtration effluent to flow from the filter bed through underdrain plate 13 to an underdrain chamber 19 during and in the direction of filtration flow, and as (b) wash water influent ports, wherein the wash water influent ports allow wash fluid to flow through underdrain plate 13 into the filter bed 20 in a direction counter to filtration flow during washing. When configured as wash water influent ports, underdrain nozzles 22 can also be used to direct a pulsing wash fluid (i.e. liquid or gas) upwards into filter bed 20 during a pulsed fluidization step (or pulsed wash sequence), as described more fully herein.

In accordance with the invention, other alternative underdrain structure configurations and underdrain nozzles may be used and are a matter of design choice and/or system configuration, as is known in the art. Furthermore, in some embodiments, a pulsing wash fluid does not flow through underdrain nozzles 22 but enters the filter bed 20 through headers (or conduits) located within the bed itself. In still other embodiments, a stream of air may also be introduced or pulsed intermittently via underdrain nozzles 22 or additional inlets (not shown) during an air scour step. One of skill in the art will recognize, however, that air scour will not generally be used if the wash fluid tends to produce foam.

In FIG. 1, the granular filter media is operatively configured to form filter bed 20, wherein the bed 20 is continuous and fills a substantial portion of tank 10 above the support means 13 and has a generally horizontal upper surface (20a) and lower surface (20b).

The vertical extent of tank 10 should slightly exceed the depth of filter bed 20 in order to accommodate expansion of filter bed 20 during fluidization flow (see 20c). The freeboard 18 (the vertical distance from top of the filter bed 20a to the top surface of the filter influent (i.e. filtrate) or wash fluid 20c) is located above the upper surface (20a) of filter bed 20. In accordance with the invention, filter 100 (whether a gravity filter, pressure filter, or other type of filter) must have sufficient height to accommodate at least a 35% freeboard, excess capacity beyond the static filter bed designed capacity, to allow for bed expansion of filter bed 20 during the washing sequences.

Filter 100, as shown in FIG. 1, further includes conduit 28 operatively configured to either a) introduce contaminated water (i.e. influent) to be treated into the top of tank 10 and through filter bed 20, or b) discharge wash water from the filter tank 10. In embodiments herein, conduit 28 is located above the top surface 20a of the filter bed, and are operatively configured to be in liquid-flow communication with filter tank 10. In accordance with the invention, alternate means of introducing the contaminated water into filter tank 10 may be used and are known in the art. As shown both in FIG. 1, tank 10 further includes conduit 27 in fluid communication with the underdrain chamber 19 and operatively configured to discharge filtered effluent from tank 10, and/or introduce wash fluid, and scouring air 29. It should also be understood that alternate and optional filtration and washing processes, systems and/or devices can be employed as are known in the art.

In embodiments disclosed herein, the filter 100 operates at a filtration flow rate of about 5 m/h through 1.2 m of activated carbon with an effective size of 1 mm. In other embodiments, the filter bed has a surface loading rate of about 0.015 gpm/ft$^2$ to about 8 gpm/ft$^2$ (i.e. 0.04-20 m/h) (for example, 0.015, 0.02, 0.03, 0.04, 0.05, 0.06, 0.07, 0.08, 0.09, 0.10, 0.11, 0.12, 0.13, 0.14, 0.15, 0.16, 0.17, 0.18, 0.19, 0.20, 0.21, 0.22, 0.23, 0.24, 0.25, 0.26, 0.27, 0.28, 0.29, 0.30, 0.31, 0.32, 0.33, 0.34, 0.35, 0.36, 0.37, 0.38, 0.39, 0.40, 0.41, 0.42, 0.43, 0.44, 0.45, 0.46, 0.47, 0.48, 0.49, 0.50, 0.51, 0.52, 0.53, 0.54, 0.55, 0.56, 0.57, 0.58, 0.59, 0.60, 0.61, 0.62, 0.63, 0.64, 0.65, 0.66, 0.67, 0.68, 0.69, 0.70, 0.71, 0.72, 0.73, 0.74, 0.75, 0.76, 0.77, 0.78, 0.79, 0.80, 0.81, 0.82, 0.83, 0.84, 0.85, 0.86, 0.87, 0.88, 0.89, 0.90, 0.91, 0.92, 0.93, 0.94, 0.95, 0.96, 0.97, 0.98, 0.99, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, or 8.0 gpm/ft$^2$), including all values, ranges and subranges therein.

Figure 2:
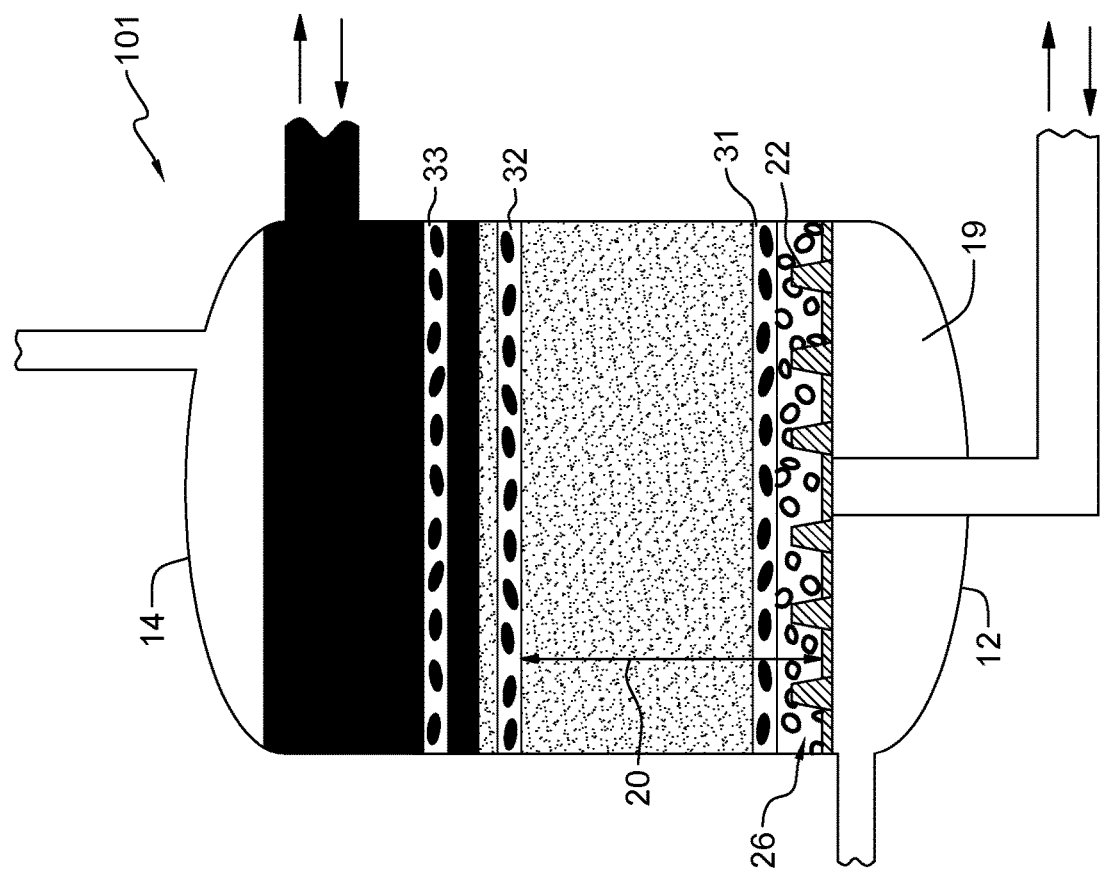
FIG. 2 is a schematic representation of an alternate embodiment of a filter that can be utilized in one embodiment of the improved system and method described herein.

Referring to FIG. 2, in alternate embodiments, filter 101 is configured similar to filter 100. However, in this embodiment, filter 101 also has one or more manifolds or headers operatively configured to introduce fluids into filter 101. Specifically, as shown here, in certain embodiments filter 101 optionally includes headers 31, 32, and/or 33. More specifically, as will be described more fully herein, header 32 optionally is operatively embedded within filter bed 20 to introduce appropriate treatment chemicals during certain wash stages. By way of example, and in exemplary embodiments herein, the treatment chemicals introduced via header 32 are oxidants selected from the group comprising dissolved ozone, chlorine, hydrogen peroxide and permanganate. In preferred embodiments, header 32 will be submerged approximately 10 cm below the top surface 20a of the filter bed 20. In other embodiments, header 32 is submerged within the range of about 1 to about 500 cm below top surface 20a of filter bed 20.

Referring again to FIG. 2, filter 101 optionally comprises air inlet/header 31 for introducing air, and/or surface wash header 33, for introducing treatment chemicals to top surface of filter bed 20 during the washing sequence. For example, during the back-and-forth washing sequence, when fluid within filter 101 is being drawn down at a draw down flow rate, as described herein, treatment chemicals optionally are uniformly introduced into the fluid bed at a flow rate lower than the drawn down rate. In this instance, although not meant to be limiting, the treatment chemicals may be either oxidants or other treatment chemicals selected from the group comprising alkaline solutions, acidic solutions, ozone (dissolved or gaseous), chlorine, hydrogen peroxide or permanganate, and solvents, and combinations thereof. More specifically, treatment chemicals may include gaseous ozone, water with dissolved ozone, ozone microbubbles, water saturated with dissolved ozone, carbon dioxide solution, saturated carbon dioxide solution, sulfur dioxide solution, saturated sulfur dioxide solution, chlorine dioxide solution, saturated chlorine dioxide solution, acidic solution, alkaline solution, hydrogen peroxide, hydrogen chloride, sodium hydroxide solution, solvents, and surfactants.

Figure 3:
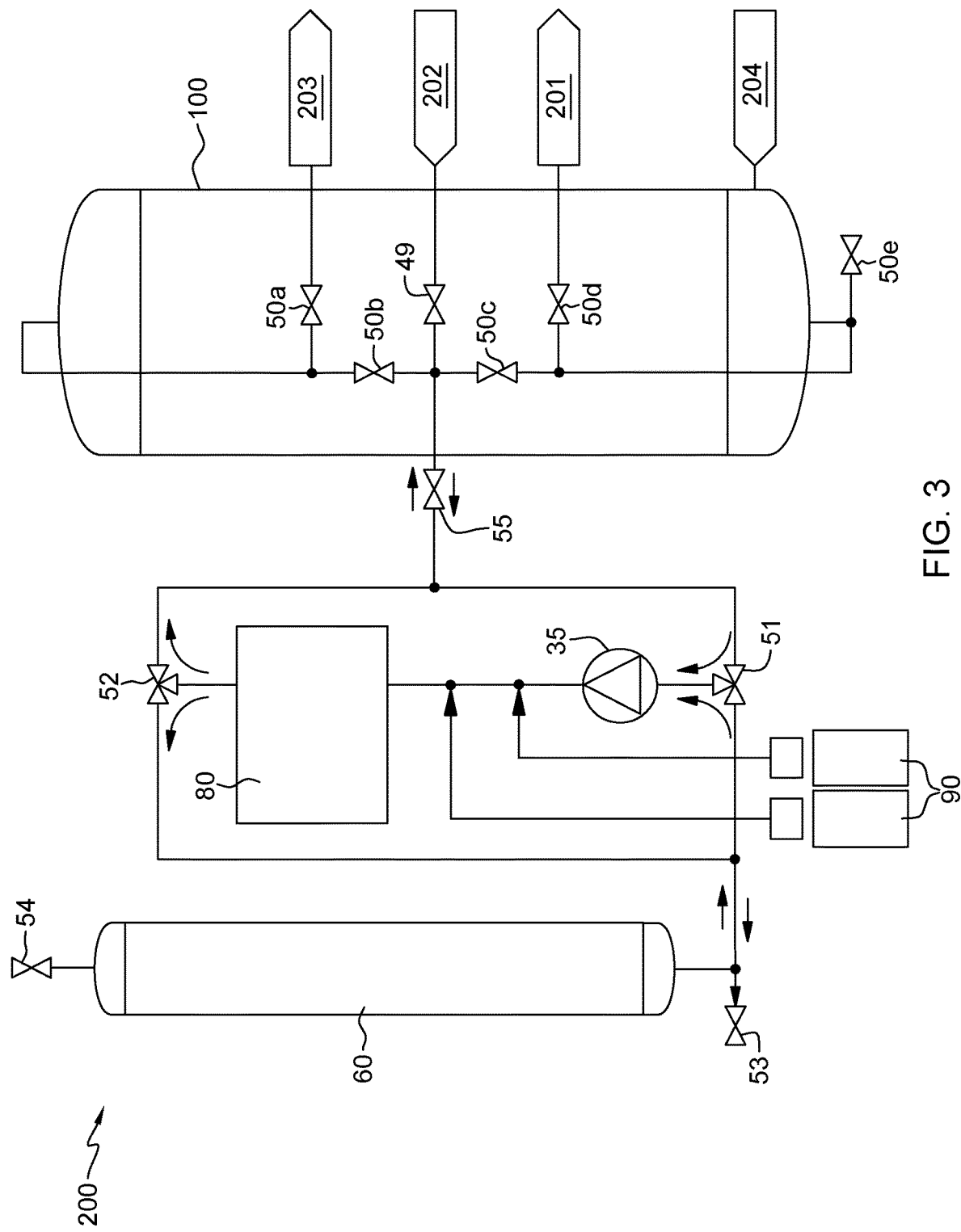
FIG. 3 is a schematic representation of a configuration for a filter system employing the improved system and method described herein, wherein the system and method use a holding tank.

Referring to FIG. 3, a schematic representation of a preferred embodiment of a filter washing system configuration 200 in accordance with the invention is shown. In this preferred embodiment, the water treatment system is configured as carbon washing system 200, which comprises, among other things, a filter 100 (first vessel) and a wash water holding tank 60 (second vessel) in fluid communication. Although not meant to be limiting, the operational configuration of system 200 would typically be preferred with water treatment systems that have only one adsorptive filter 100, or when only one filter at a time can be washed (e.g. two units cannot be taken out of service at once). Furthermore, in this embodiment the construction materials of filter 100 will be compatible with the anticipated wash fluids and/or treatment solutions (i.e. the chemicals needed for washing). Although not meant to be limiting, this embodiment has several benefits over other configurations, also disclosed herein. For example, using this configuration a) allows one to use a single wash water header instead of two; b) one can use fewer 3-way valves; c) it facilitates wash fluid preparation; d) the same external tank can be used to treat the spent or processed wash fluid between filter cleaning sequences; and e) only one filter is taken off-line at a time.

As shown here, the washing system 200 comprises a filter 100, a holding tank 60, a plurality of valves 49, 50a-e (typically included with fixed bed pressure filters), 51, 52 and 55, and a wash pump 35. Optionally, in embodiments disclosed herein, system 200 comprises an ozone dissolution device 80 and chemical feeds 90. The system will also comprise the appropriate piping and automatic controls operatively configured with valves (e.g. 49/50/51/52/55) and pumps to periodically reverse, or alternate, the wash water flow for back and forth washing. Holding tank 60 typically will have vent 54 and drain 53.

In accordance with this embodiment, system 200 may comprise a feed water stream 202, a recycle or waste stream 203, and a process/distribution (or processed wash fluid) stream 201, and optionally an air scour stream 204.

In this embodiment, valves 49/50/51/52/55 each are operatively configured to alternate or cycle the flow direction for back-and-forth flow. In certain embodiments this process will be automated; however, these and other valves can be manual or automatic, according to design choice or the system configuration. To start the back-and-forth washing sequence, valves 49/50/51/52/55 are placed in the positions appropriate for backwashing.

As illustrated herein, valves 51 and 52 are 3-way pump suction selection valves. During the washing operation, if a prepared wash fluid is not being used and instead chemicals will be added while washing, filter 100 is not drained. In this embodiment, valve 51 is configured so that wash fluid is drawn from the bottom of filter 100 to be washed, through the underdrain system, effectively filtering any fines from the filter media, using the correct filtration flow direction for this purpose, and valve 52, another 3-way valve, is configured to send the drawn-down wash fluid to holding tank 60. To complete the first back and forth cycle, valves 51 and 52 will then be configured for reverse flow, to allow the wash fluid to return to filter 100 with a first wash flow rate, thus regenerating, disinfecting and/or sanitizing the filter media. In still other embodiments, the functionality of each 3-way valve can equally be achieved with two 2-way valves.

In still other embodiments, if a prepared wash fluid is to be used, the wash fluid will be prepared in holding tank 60. Next, 3-way pump suction selection valve 51 is set to draw from filter 100 and any remaining water or wash fluid in filter 100 is drawn down through the underdrain system. The drawn down fluid may be recycled to the influent of the water treatment train, or sent to a chemical storage tank where it may be treated for reuse or disposal, or sent to drain. Once this step is complete, valve 51 is configured to draw from holding tank 60 and valve 52 is set to send the prepared wash solution/fluid to filter 100 (i.e. first flow direction, counter to filtration flow), so that filter 100 is filled with the wash fluid for the current stage. To complete the cycle, the valves are the switched to reverse the flow (i.e. second flow direction, same direction filtration flow).

Chemical feed systems 90 will be operatively configured to introduce various treatment chemicals into the wash fluid either before or during the washing cycles. For example, in embodiments of the invention, particularly where the filtration system is being used for disinfection, the pH of the wash fluid is monitored, and/or adjusted to achieve a pH range of about 5.0-7.0 (e.g., 5.0, 5.5, 6.0, 6.5, or 7.0) prior to entering the filter bed. To achieve this pH range, one of chemical feeds 90 will comprise a pH adjustment system (or pH control). In this example, the desired pH can be achieved via the pH adjustment by injecting acidic chemicals into the wash fluid. One of ordinary skill in the art will recognize that any suitable system for monitoring and adjusting the pH of the wash water can be incorporated.

While the above pH range is suitable for disinfection, a different pH range may be required for other filtration applications. For example, in alternate embodiments, the inventive method can be used to adsorb non-organics, such as chlorine. And in still other embodiments, the method can be employed to oxidize hazardous contaminants, such as arsenic or phenols, filtered from a waste stream. In the latter case, one of ordinary skill in the art will recognize that an increased pH in the range of about 8 to about 10 (e.g., 8.0, 8.5, 9.0, 9.5, or 10.0) would be preferred to enhance the oxidizing potential of ozone by generating OH° free radicals. In this example, the desired pH can be achieved via the pH adjustment by injecting alkaline chemicals into the wash fluid.

Referring again to FIG. 3, in operation, water is cyclically and intermittently drawn from a first vessel (i.e. filter 100) to a second vessel (i.e. holding tank 60) then returned to the filter 100 so there is no net consumption of water with each cycle, thereby creating a back and forth flow. Treatment chemicals may be added to wash fluid prior to or during each stage of the wash sequence. Holding tank 60 may be hydro-pneumatic, wherein a gas (e.g. air) trapped in the top of tank 60 is compressed and pressurizes the wash fluid as tank 60 fills up, reducing the power required to pulse the flow for media fluidization and stratification.

During the washing sequence, in embodiments where one or more oxidants, e.g. dissolved ozone, are required to regenerate and/or sanitize the filter media, the oxidant is quickly depleted and reverted to less reactive oxygen as it passes through the static media bed. This limits the capacity of the dissolved ozone to infiltrate the bed to about 5 cm, which is problematic given a typical filter bed has a depth of 100 cm or more. In these embodiments, the issue can be addressed by fluidization (pulsed or otherwise) within the bed, which allows filter media to be agitated and resettled toward the bottom of the filter bed, where it can be treated by the ozone entering the bottom of filter 100. More specifically, although dissolved ozone may penetrate only a short distance into a filter be, by alternately fluidizing the filter bed and introducing ozonated water at a relatively low flow rate, all the porous filter media eventually receives the beneficial effect of the ozone.

In still other embodiments, pulsed fluidization has been found to reduce the quantity of wash fluid required to carry out the intended regeneration process. In these embodiments, the washing method disclosed herein further comprises wash water pulses to briefly fluidize the filter media in order to renew the granular media at the bottom of the filter bed with each pulse. Then, dissolved ozone is introduced into the bottom of the filter bed to regenerate the adsorptive capacity of the renewed filter media. In this way, with repeated pulses, substantially all of the filter media can be exposed to the dissolved ozone and treated during each wash sequence.

In certain embodiments, although not meant to be limiting, each pulse of fluid (air or liquid) is continued for a time period within the range of about 30 seconds and produces agitation and rearrangement of filter media within the filter bed. In other embodiments, the pulses are within the range of about 5 to about 300 seconds, including all values and ranges therein.

The pulsed fluidization and oxidant-containing wash water discussed above may be introduced from either below the filter bed, above the filter bed, or both. In certain embodiments, the use of a fluidizing pulse both above and below a filter bed can substantially increase (i.e. double) the impact of each fluidizing pulse. For example, referring to the embodiment in FIG. 2, to effectively apply the dissolved oxidant from above filter bed 20, control means must be provided to maintain the water level near the top surface 20a of filter bed 20 so that the ozonated water can be uniformly distributed via header 33 over the top surface 20a of filter bed 20. In still other embodiments, if the washing system configuration incorporates surface wash nozzles (not shown, but known in the art), implementation of bidirectional oxidative cleaning can be achieved.

As discussed above, in certain embodiments (see FIG. 2), an alternate method of introducing dissolved oxidants into filter bed 20 employs header 32, wherein header 32 is submerged in filter bed 20. The appropriate oxidant is then disbursed from header 32 over the cross section of the filter bed 20, so that during slow upward wash flow (i.e. first wash flow direction), the filter media around and immediately above header 32 will be exposed to, contacted and treated by the oxidant. This first flow direction is in the direction opposite to filtration flow or in the same flow direction as a typical back wash flow. In contrast, during downward wash flow (i.e. second wash flow direction, in the same direction of filtration flow), the filter media around and immediately below header 32 will be exposed to, contacted and treated by the oxidant. Indeed, because the oxidant travels only a short distance through the static filter bed 20, this method may be used even when vessel/tank 10 (or filter vessel) is not fully resistant to the oxidant.

In embodiments where pulsed fluidization/pulsed wash sequence is used to renew the layer of granular filter media closest to the oxidant entry point, the layer of filter media is exposed to the dissolved oxidant entering the filter bed, wherein the oxidant enters the bed between the pulses. In accordance with the invention, the filter bed may be fluidized by wash water alone, or combined with air scour to substantially reduce water flow required to fluidize the bed. When air is used to assist in fluidization, the water flow can be held nearly constant, and the air flow can be pulsed to achieve the necessary periodic fluidization.

During the washing sequence, each back and forth flow (or cycle), with or without initial pulses, is repeated as many times as necessary to achieve the desired washing (regeneration, disinfection and/or sanitization) of the media, thus producing a processed wash fluid. The complete washing sequence may include several stages where different chemicals are added to the wash water to aid in cleaning the media, and between stages the media may be flushed with clean water or drained to a storage and treatment tank if the cleaning chemicals are to be recycled.

For example, in certain embodiments, although not meant to be limiting, a sufficient number of cycles with the washing stage is 10, and within the range of about 1 to 200 cycles, (e.g. 1, 2, 3, 4, 5, 10, 15, 20, 25, 30, 40, 50, 60, 100, 150, 200), including all values, ranges and subranges therein (e.g. 1-3, 1-5, 1-10, 2-5, 2-9, 2-10, 5-10, 8-10, 10-15, 10-20, 15-20, 15-30, 10-50, 50-100, 50-200). In certain embodiments, the number of stages is 1, and will be in the range of about 1 to about 6, (e.g. 1, 2, 3, 4, 5, 6), including all values, ranges and subranges therein (e.g. 1-2, 1-3, 1-4, 1-5, 2-3, 2-4, 2-5, 2-6, 3-4, 3-5, 3-6, 4-5, 4-6, 5-6). Regardless of the number of cycles or stages, the washing sequence is continued until the filter media is sufficiently regenerated, sanitized, disinfected, or otherwise scrubbed/cleaned, to be returned to filtration mode. The precise number of wash cycles and stages required will be dependent on any number of facts, including but not limited to the contaminants present in the water being treated, the filter media, and the system configuration.

Although not meant to be limiting, in a typical filter configuration, the wash sequence will have a draw down flow rate (downward) typically in the range of about 2 to about 50 m/h, (e.g. 2, 3, 5, 10, 15, 20, 25, 30, 40, 50 m/h), including any and all ranges and subranges therein (e.g. 2-50, 3-50, 5-50, 2-40, 5-20, 5-30, 5-40, 10-50, 10-30, 20-50, 30-50 m/h).

The fluid flow velocity employed during the upward flow into the filters is sufficient to achieve substantial, or preferably complete, fluidization of the filter bed. For purposes of this application, this is referred to as a minimum fluidization velocity. In preferred embodiments of the invention, the minimum fluidization velocity is between about 15-50 m/h, including any and all ranges and subranges therein, with a preferred velocity of about 40 m/h. In certain embodiments, depending on the size of the porous particles and other factors such as volume of the tank, etc., the minimum fluidization velocity will vary from about 5 m/h to about 60 m/h, (e.g. 5, 10, 15, 15.5, 20, 25, 30, 40, 50, 60 m/h), including any and all ranges and subranges therein (e.g. 5-8, 5-9, 5-10, 5-20, 5-30, 5-50, 10-20, 10-30, 20-50, 20-60, 10-60, 30-50, 30-60 m/h).

In embodiments utilizing the above flow rates, the washing step in the upward flow direction will have a duration of about 60 seconds, or in the range of about 5 to 300 seconds (e.g. 5, 6, 7, 8, 9, 10, 15, 20, 30, 40, 50, 60, 100, 150, 200, 250, 300 seconds), including any and all ranges and subranges therein (e.g. 5-10, 5-20, 5-30, 5-60, 5-100, 5-200, 10-60, 10-100, 10-150, 10-200, 10-300, 50-100, 50-200, 50-300, 100-150 100-200, 200-300 seconds). In contrast, if a pulsed fluidization flow rate is used (with air or liquid), the washing step in the upward flow direction will have duration of about 6 minutes, or in the range of about 1 to 20 minutes, (e.g. 1, 2, 3, 4, 5, 6, 7, 8, 9, 10, 13, 15, 18, 20 minutes), including any and all ranges and subranges therein (e.g. 1-5, 1-6, 1-10, 2-6, 5-6, 6-7, 6-10, 6-15, 5-10, 5-20, 10-20, 15-20 minutes).

In these embodiments, the pulsed fluidization velocity will vary from about 5 m/h to about 60 m/h (e.g. 5, 10, 15, 15.5, 20, 25, 30, 40, 50, 60 m/h), including any and all ranges and subranges therein (e.g. 5-8, 5-9, 5-10, 5-20, 5-30, 5-50, 10-20, 10-30, 20-50, 20-60, 10-60, 30-50, 30-60 m/h). The high initial flow rate needed for introducing a pulsed fluidization flow rate can be achieved in a variety of different ways. For example, it can be achieved with the use of a hydro-pneumatic holding tank, by momentarily increasing the speed of wash pump 35 or by momentarily opening a bypass around a flow restrictor (not shown).

In exemplary embodiments, the volume of water required to wash the filter media will be substantially reduced by at least 50%, or in the range of about 10 to about 90%. For example, in certain embodiments the volume of wash fluid needed will only be 2 bed volumes, or in the range of about 1 to 10 bed volumes (e.g. 1, 2, 3, 4, 5, 6, 7, 8, 9, 10 bed volumes), including all values, ranges and subranges therein (e.g. 1-10, 1-2, 1-3, 1-5, 1-8, 2-3, 2-5, 2-7, 2-10, 3-5, 3-10, 4-5, 5-6, 5-9, 5-10, 6-9 bed volumes). One of ordinary skill in the art will recognize, however, that the volume required will be largely dependent on the type of adsorbed organics, the filter medium, and the system configuration overall.

In certain embodiments, each full washing cycle (i.e. back and forth flow direction) takes about 2 minutes to 20 minutes, preferably about 5 minutes. In others, each full washing cycle is between about 1 to about 60 minutes (e.g. 1, 2, 3, 4, 5, 6, 7, 8, 9, 10, 13, 15, 18, 20, 21, 25, 30, 40, 50, 55, 60 minutes), including any and all ranges and subranges therein (e.g. 1-5, 1-6, 1-10, 1-40, 1-50, 2-6, 2-10, 2-25, 5-6, 5-10, 5-20, 5-30, 5-50, 5-60, 6-7, 6-10, 6-15, 10-15, 10-20, 10-40, 15-20, 15-40 minutes).

In certain embodiments, the entire washing sequence (all stages) takes about 60 minutes to 240 minutes, preferably about 120 minutes. In others, each cycle is between about 10 to about 480 minutes (e.g. 10, 20, 25, 30, 40, 50, 60, 65, 70, 80, 90, 100, 120, 125, 140, 150, 200, 300, 320, 400, 450, 480 minutes), including any and all ranges and subranges therein (e.g. 10-20, 10-60, 10-120, 10-480, 15-20, 15-40, 60-100, 60-120, 60-150, 60-200, 60-300, 60-480, 100-120, 120-150, 120-240, 120-300, 120-400 minutes).

Although the above ranges are typical, the length of time will be different from filter to filter and therefore must be experimentally determined. For example, in some embodiments, depending on various factors (e.g. the nature and quantity of the adsorbed organics and material to be removed, the depth and composition of the filter bed, the number of filters to be cleaned, the requisite residency time, temperature, etc.), a washing sequence may take more than 480 minutes (8 hours or more). A predetermined wash sequence time can be optimized to obtain a desired level of sanitization, and also regeneration when appropriate, in accordance with the knowledge of those skilled in the art (e.g. for sanitization, this can include a measurement of RLU of a water sample drawn from the bed, or other similar biological marker). Although the washing sequence time may vary depending on the system, the length of downtime for system will be minimal and the system can return to normal operating mode immediately following the washing sequence.

By way of example only, and not meant to be limiting, a typical sequence which employs a holding tank to wash a single filter as shown in FIG. 3, is shown in Table 1:

TABLE 1

| STEP | DETAILS | DETAILS (alternatives/optional) |
|---|---|---|
| 1 | Filter valves 50(a-e) are configured for backwash flow (countercurrent to filtration flow), namely valve 50a open, valve 50b closed, valve 50c open, valve 50d closed, valve 50e closed. Valve 49 is closed and valve 55 is open. | Alternate Configuration: If holding tank 60 is hydro-pneumatic, drain valve 53 and vent 54 are closed, and valve 50a is closed. |
| 2 | A wash fluid/solution is prepared in holding tank 60 and filter 100 is drained; i.e. Valve 50e is opened to drain liquid out of filter 100. Any water in filter 100 is drawn down through the underdrain system, where it can be recycled to the influent of the water treatment train or sent to drain. | Optionally, skip Step 2: If treatment chemicals will be added during the washing sequence via, for example, header 33 (see FIG. 2) or chemical feed stations 90, a prepared wash fluid in holding tank 60 is not required |
| 3 | Wash pump 35 is started | |
| 4 | Water is transferred from filter 100 to the holding tank 60: Valve 51 is configured to draw from filter 100, valve 52 is configured to send liquid to the holding tank from filter 100 in a first draw down direction and flow rate, wherein the first draw down direction is equivalent to the filtration flow direction for filter 100. Any water in filter 100 is drawn down through the underdrain system, and used to fill holding tank 60. | If Step 2 is included, skip Step 4 |
| 5 | Valve 51 and 52 are reversed, i.e. valve 52 is configured to draw wash fluid 70 from holding tank 60 and valve 51 is set to send wash fluid 70 to filter 100 in a first wash flow direction (i.e. reverse flow direction for filter 100), so that filter 100 is substantially, if not completely, filled with wash fluid, without overflowing | |
| 6 | If the wash fluid requires heating, a heater (not shown) is turned on. If the wash fluid is to be ozonated, ozone system 80 is started. If chemicals are to be dosed into the wash fluid during the wash sequence, the corresponding dosing pumps from chemical feed station 90 are started. | |
| 7 | Valves 51 and 52 are configured to draw the wash fluid from filter 100 to holding tank 60 | |
| 8 | Wash fluid is drawn down in filter 100 in a draw down direction and at a draw down flow rate, until the top surface of the wash fluid reaches the upper surface of the filter bed | If filter 100 incorporates surface wash header/nozzles 33 (see FIG. 3), an oxidant (e.g. dissolved ozone) may be introduced during this step through header 33, at a flow rate less than the draw down flow rate, to treat the upper layer of filter bed 20 |
| 9 | The wash fluid from filter 100 is pumped via wash pump 35 in a second wash flow direction to holding tank 60. | Optionally, the wash fluid will pass through ozone injection system 80, chemical feed station 90, and/or a heater prior to entering holding tank 60 |
| 10 | Valves 51 and 52 are configured to draw the wash fluid from holding tank 60 to filter 100, where the wash fluid is pumped via pump 35 through the filter bed in a first/forward wash flow direction (i.e. reverse flow direction for filter 100). | Optionally, the wash fluid will pass through ozone injection system 80, chemical feed station 90, and/or a heater prior to entering filter 100 |
| 11 | Fluidization Step: The flow rate of the wash fluid into the filter bed is increased for a set period of time to a sufficient fluidizing flow rate to fluidize the filter media and thus renew the bottom layer/portion of the filter bed, thereby exposing the filter media within the renewed bottom layer to dissolved ozone or treatment chemicals entering from the bottom of the filter bed. | Optionally, air scour may be introduced during this step through the underdrain system to provide for fluidization of the filter bed with less water flow over a longer time. Optionally, when oxidants are required, a fluidizing pulse step is used to renew the bottom layer of the filter bed. The intermittent introduction of air scour may be used to pulse fluidize the bed, without changing the water flow. Alternatively, pulsed fluidization is achieved by intermittent periods of a flow rate of the wash fluid (at or above fluidization rate). |

TABLE 1-continued

| STEP | DETAILS | DETAILS (alternatives/optional) |
|---|---|---|
| 12 | The flow rate of the wash fluid into the filter bed is reduced to a rate below the fluidizing flow rate, and the flow of wash fluid into filter 100 continues until filter 100 is full, without overflowing. | |
| 13 | Steps 7 through 12 are cycled/repeated as often as required to achieve the desired level of regeneration and/or sanitization for the current stage. | |
| 14 | The heater, ozone system 80 and dosing pumps 90 are turned off. | |
| 15 | If filter 100 is to be flushed, valves 50a, 50c and 49 are opened for a time sufficient for flushing and then closed. Drain valve 53 and vent 54 are opened to drain holding tank 60. | |
| 16 | Once holding tank 60 is empty, drain valve 53 is closed so that wash fluid 70 may be prepared in the tank if required for a subsequent stage. | |
| 17 | Steps 2 through 16 are repeated for each stage in the sequence to produce a processed wash fluid. | |
| 18 | Wash pump 35 is stopped, valve 55 is closed and valve 49 is opened. | |
| 19 | Filter valves are returned to their operating positions: 50a closed, 50b open, 50c closed, 50d open, 50e closed. | |

By following the above steps, the washing method thereby performs a washing stage with a wash fluid by cycling a flow of the wash fluid between the first and second vessel in a first and second flow direction to produce a back-and-forth flow of the wash fluid through the adsorptive medium. During the washing stage, the back-and-forth flow of the wash fluid between the first and second vessel is performed for a sufficient number of cycles and a time period sufficient to at least partially regenerate the adsorptive medium, thereby producing a processed wash fluid. Then, the back-and-forth flow of the processed wash fluid between the first and second vessel is stopped. Following the washing stage, the processed wash fluid will be drained from the first vessel and/or second vessel, and the system will return to filtration flow. In addition, the method may comprise one or more waste treatment steps, each of which are well known in the art, namely: flushing the first vessel, flushing the second vessel, discharging the processed wash fluid to waste, neutralizing the processed wash fluid, treating the processed wash fluid to generate at least one additional wash fluid for reuse, and/or rinsing the adsorptive medium.

Figure 4:
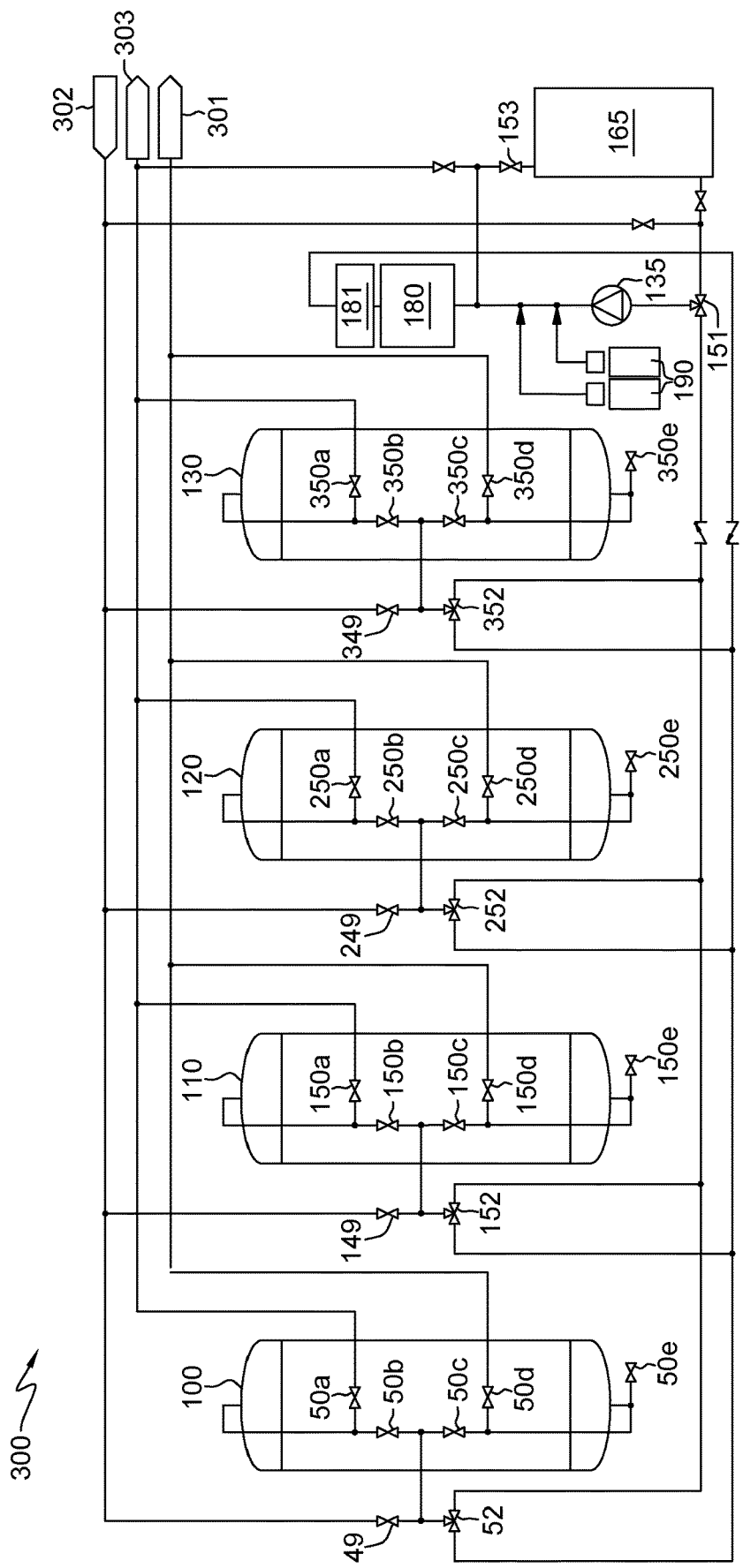
FIG. 4 is an alternate embodiment of a configuration for a filter system employing the improved system and method described herein, wherein the system and method employs two or more filters simultaneously in pairs for the washing sequence in place of a holding tank.

FIG. 4 illustrates yet another embodiment of the invention. In this figure, a schematic representation of an alternate embodiment of a filter washing method and water treatment system configuration in accordance with the invention is shown, wherein water treatment system 300 employs two or more filters simultaneously in pairs (in place of a holding tank) in accordance with the carbon washing method. In this embodiment, the water treatment system is a filtration system comprising multiple filters (e.g. filter 100, 110, 120 and 130), wherein filter 100 comprises a first filter bed, filter 110 comprises a second filter bed, filter 120 comprises a third filter bed, and filter 130 comprises a fourth filter bed. According to this system and method, provided that one or more pairs of filter units/elements within the filtration system can be taken out of service at the same time, the back-and-forth flow washing method and system disclosed herein can be implemented between one or more pairs of filters in system 300, without the need for a holding tank. Although not meant to be limiting, this system configuration would typically be used when the water treatment system has several filters and standby filtration capacity, filtered water storage capacity, or non-continuous water demand, and the construction materials of the filters are compatible with the chemicals needed for washing.

More specifically (and by way of example only), instead of using a holding tank, system 300 is operatively configured to allow wash water to flow back-and-forth between filter 100 and 110, which have been taken out of service, specifically by providing for water to be intermittently drawn from filter 100 to filter 110, then withdrawn from filter 110 and returned to filter 100, thereby achieving no net consumption of wash water within each wash cycle.

In accordance with this embodiment, chemicals may be added to the wash water either prior to each stage or during each stage of the wash sequence. Although the numerical references used herein refer to filters 100 and 110 in FIG. 4, any pair of filters can be washed at once. System 300 may comprise a feed water stream 302, a recycle or waste stream 303, and/or a process/distribution stream 301.

In this embodiment, as shown in FIG. 4, the washing system 300 further comprises a plurality of additional valves 50*a-e*, 150*a-e*, 250*a-e*, and 350*a-e* (typically included with fixed bed pressure filters), 153, 49, 149, 249, 349, and a wash pump 135. Optionally, in embodiments disclosed herein, system 300 comprises an ozone dissolution device 180, heater 181 and chemical feeds 190. The system will also comprise the appropriate piping and automatic controls operatively configured with three way valves 151, 52, 152, 252, 352 to periodically reverse, or alternate, the wash water flow for back and forth washing. In certain embodiments this process will be automated; however, these and other valves can be manual or automatic, according to design choice or the system configuration.

Although not meant to be limiting, a typical sequence where one or more filters are washed in pairs as shown in FIG. 4, is shown in Table 2.

TABLE 2

| STEP | DETAILS | DETAILS (alternatives/optional) |
|---|---|---|
| 1 | Filter valves 50 in the pair of targeted filters (here, 100 and 110) are configured for backwash flow (countercurrent to filtration flow), namely valve 50a and 150a open, valve 50b and 150b closed, valve 50c and 150c open, valve 50d and 150d closed, | |

TABLE 2-continued

| STEP | DETAILS | DETAILS (alternatives/optional) |
|---|---|---|
|  | valve 50e and 150e closed. Valves 49 and 149 are closed. |  |
| 2 | Wash pump 35 is started. |  |
| 3 | A prepared wash fluid is prepared in wash fluid/solution storage tank 165 | Optionally, skip Step 3: If treatment chemicals will be added during the washing sequence; a prepared wash fluid in wash fluid storage tank 165 is not required |
| 4 | Filters 100 and 110 are drained: Valves 50e and 150e are opened to drain liquid out of filters 100 and 110. Any water in filters 100 and 110 is drawn down through the underdrain system, where it can be recycled to the influent of the water treatment train or sent to drain | Optionally, skip Step 4: If step 3 is not needed, filter 100 is not drained |
| 5 | Valve 151 is configured to draw wash fluid from wash fluid storage tank 165 and filter in/out valve 52 is configured to send wash fluid to filter 100 in a first wash flow direction (i.e. reverse flow direction for filter 100), so that filter 100 is substantially, if not completely, filled with the wash fluid, without overflowing | Optionally, skip Step 5: If steps 3 and 4 are not needed, filter 100 is not filled with prepared wash fluid from storage tank 165 |
| 6 | If the wash fluid requires heating, heater 81 is turned on. If the wash fluid is to be ozonated, ozone system 80 is started. If chemicals are to be dosed into the wash fluid during the wash sequence, the corresponding dosing pumps from chemical feed station 90 are started. |  |
| 7 | Valves 151 and 52 are configured to draw the wash fluid from filter 100, while valve 152 is configured to send wash fluid 70 to filter 110 |  |
| 8 | The wash fluid is drawn down in filter 100 in a first draw down flow direction (i.e. filtration flow direction for filter 100) and at a first draw down flow rate, and wash pump 135 pumps the wash fluid to filter 110. | Optionally, if filter 100 incorporates surface wash header/nozzles 33 (see FIG. 3), an oxidant (e.g. dissolved ozone) may be introduced during this step through header 33, at a flow rate less than the first draw down flow rate, to regenerate and/or sanitize the upper layer of filter bed of filter 100 |
| 9 | The wash fluid is pumped through the filter bed of filter 110 in a second wash flow direction (i.e. reverse flow direction through filter 110). | Optionally, the wash fluid will pass through ozone injection system 80, chemical feed station 90, and/or a heater prior to entering filter 110 |
| 10 | Fluidization Step: The flow rate of the wash fluid into the filter bed of filter 110 is increased for a set period of time to a sufficient fluidizing flow rate to fluidize the filter media in filter 110 and thus renew the bottom layer/portion of the filter bed, thereby exposing the filter media within the renewed bottom layer to dissolved ozone or treatment chemicals entering from the bottom of filter 110. | Optionally, air scour may be introduced during this step through the underdrain system to provide for fluidization of the filter bed of filter 110 with less water flow. Optionally, a fluidizing pulse step is used to renew the bottom layer of the filter bed of filter 110. For example, pulsed fluidization can be achieved using the intermittent (i.e. pulsed) introduction of air scour to fluidize the bed without changing the water flow; or by intermittent periods of a wash fluid flow rate at or above the fluidization rate. |
| 11 | The flow rate of the wash fluid into the filter bed of filter 110 is reduced to a rate below the fluidizing flow rate, and the flow of wash fluid into filter 110 continues until filter 110 is full, without overflowing. |  |
| 12 | Flow direction is then reversed by switching the positions of valves 151, 52 and 152 to flow the wash fluid from filter 110 to filter 100 |  |
| 13 | Wash fluid is drawn down in filter 110 in a second draw down flow direction (i.e. filtration flow direction for filter 110) and at a second draw down flow rate, and wash pump 135 pumps the wash fluid to filter 100. | Optionally, if filter 110 incorporates surface wash header/nozzles 33, an oxidant (e.g. dissolved ozone) may be introduced during this step through header 33, at a flow rate less than the second draw down flow rate, to regenerate and/or |

TABLE 2-continued

| STEP | DETAILS | DETAILS (alternatives/optional) |
|------|---------|-------------------------------|
|      |         | sanitize the upper layer of filter bed of filter 110 |
| 14   | Wash fluid is pumped through the filter bed of filter 100 in a first wash flow direction (i.e. reverse flow direction through filter 100). | Optionally, wash fluid will pass through ozone injection system 80, chemical feed station 90, and/or a heater prior to entering filter 100 |
| 15   | Fluidization Step: The flow rate of wash fluid into the filter bed of filter 100 is increased for a set period of time to a sufficient fluidizing flow rate to fluidize the filter media in filter 100 and thus renew the bottom layer/portion of the filter bed, thereby exposing the filter media within the renewed bottom layer to dissolved ozone or treatment chemicals entering from the bottom of filter 100. | Optionally, air scour may be introduced during this step through the underdrain system to provide for fluidization of the filter bed of filter 100 with less water flow. Optionally, a fluidizing pulse step is used to renew the bottom layer of the filter bed of filter 100. For example, pulsed fluidization can be achieved using the intermittent (i.e. pulsed) introduction of air scour to fluidize the bed without changing the water flow; or by intermittent periods of a wash fluid flow rate at or above the fluidization rate. |
| 16   | Steps 7 through 15 are cycled/repeated as often as required to achieve the desired level of regeneration and/or sanitization of the filter media. | |
| 17   | Heater 85, ozone system 80 and dosing pumps 90 are turned off. | |
| 18   | If filters 100 and 110 are to be flushed, valves 50a, 150a, 49 and 149 are opened for a time sufficient for flushing and then closed. | |
| 19   | Steps 3 through 18 are repeated for each stage in the sequence. | |
| 20   | Wash pump 35 is stopped, and valve 49 and 149 are opened. | |
| 21   | Filter valves are returned to their operating positions: valves 50a and 150a closed, valves 50b and 150b open, valves 50c and 150c closed, valves 50d and 150d open, valves 50e and 150e closed. | |

Figure 5:
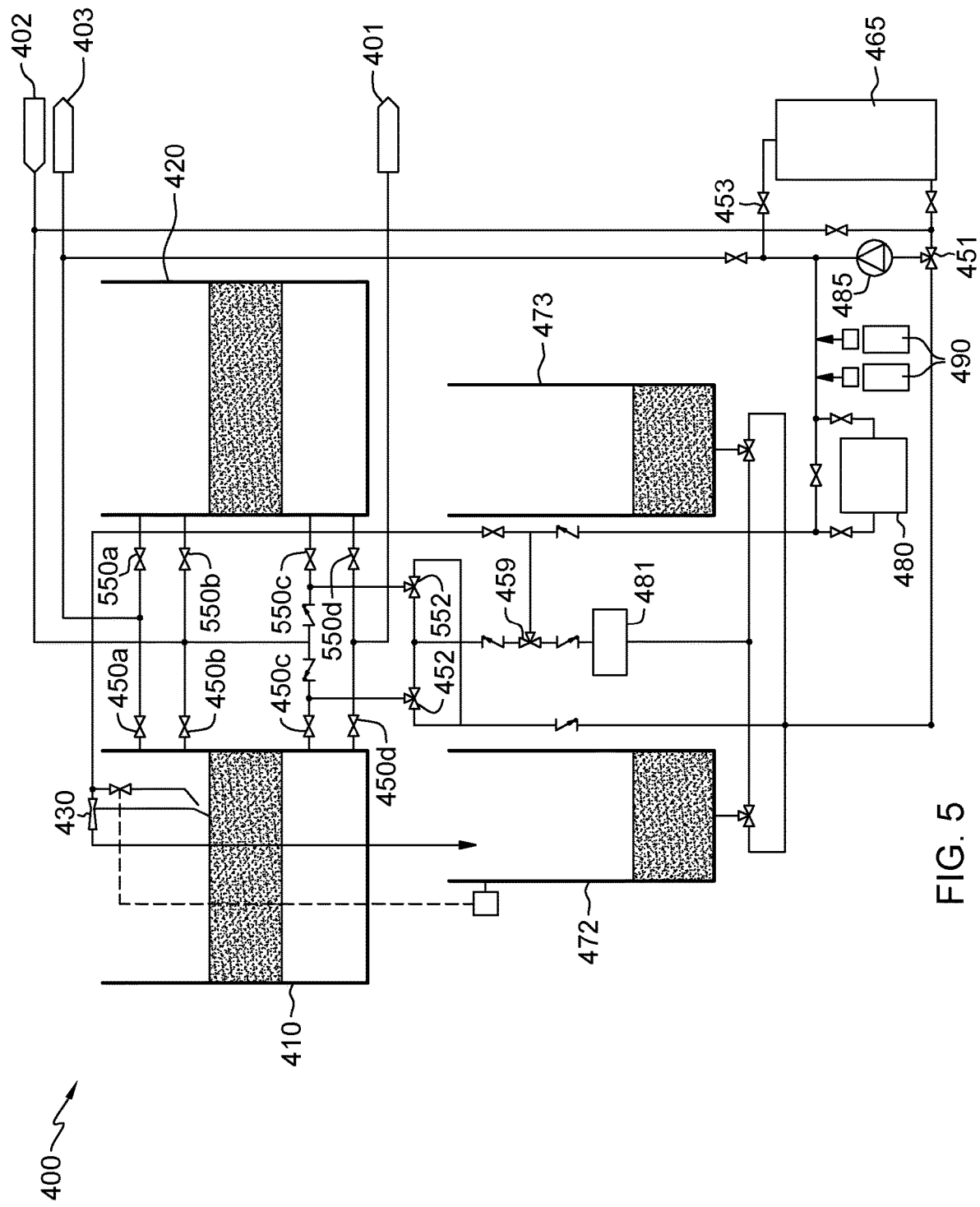
FIG. 5 is an alternate embodiment of a configuration for a filter system employing the improved system and method described herein, wherein the system and method use an external washing tank.

FIG. 5 illustrates yet another embodiment of the invention in a water treatment system. In this figure, a schematic representation of a filter washing system configuration 400 in accordance with the invention is shown, wherein the carbon washing method and/or system can wash two or more filters 410 and 420 simultaneously in pairs and/or, periodically, can wash the granular filter media from filters 410 and 420 in an external washer 472/473. In accordance with this embodiment, system 400 comprises a feed water stream 402, a recycle or waste stream 403, and a process/distribution stream 401.

For example, this particular configuration is appropriate for large GAC municipal gravity filters, usually constructed of concrete which would be damaged by strong cleaning chemicals. The granular filter media can be washed in place for control of bacterial growth and surface fouling of the media, and occasionally washed in the first and/or second external washer 472 and/or 473 for deeper cleaning with strong chemicals. In this embodiment, although not meant to be limiting, the 3-way selection value 459 determines whether washing is done in filters 410/420 or in the external washers 472/473. System 400 further includes a holding/storage tank 465 for preparing and storing a prepared wash fluid/solution.

The wash sequence in this embodiment, including the external washer, is essentially the same as that described for washing a pair of filters (see, e.g. FIG. 4), however in the embodiment shown in FIG. 5, stronger chemicals may be used. Furthermore, in accordance with the invention, air scour and/or dissolved ozone should not be used in the first and second external washers 472/473 when the wash fluid contains flammable solvents, caustic soda or surfactants that tend to foam.

During the stage where washing is to be completed externally, this embodiment will include the additional step of transferring the filter media to be washed to the external washers. More specifically, the granular filter media to be regenerated and/or sanitized would be transferred from filters 410 and/or 420 to the external washer 472 and then returned to the original filters once washing is complete. For example, in certain embodiments and as shown in FIG. 5, one method of transferring filter media from filter 410 to washer 472 is via filter transfer means, wherein filter transfer means comprises one or more portable or movable eduction nozzles (or educator) 430 which aspirates a slurry of the filter media from filter 410 into washer 472.

In certain embodiments, municipal and other large water treatment plants will have multiple filters constructed of concrete, wherein the volume of carbon in each filter is too large to wash all at once in a reasonably sized external washer. In this case, a first fraction of filter media from one filter will be sent to the external washer and the remainder overlaid on another filter (i.e. one not being cleaned), so that the filter media can be washed in batches. This will continue until the first filter being cleaned is empty, and the step of refilling the first filter with clean media can begin. This process is then repeated with each of the remaining filters to be cleaned. The clean media can be returned to the original bed, for example, by using the same filter transfer means to transfer a slurry of cleaned filter media from washer 472 to filter bed 410. During operation, flow through the one or more educators 430 is periodically stopped and redirected to the point of aspiration to loosen the media and so that the receiving vessel (i.e. the external washer or filter, depending on which direction) does not overflow.

In this embodiment, as shown in FIG. 5, the washing system 400 further comprises a plurality of additional valves 450a-d and 550a-d (typically included with fixed bed gravity filters), 453, and a wash pump 485. Optionally, in embodiments disclosed herein, system 400 comprises an ozone dissolution device 480, heater 481 and chemical feeds 490. The system will also comprise the appropriate piping and automatic controls operatively configured with three way valves 451, 452, 459 and 552 to periodically reverse, or alternate, the wash water flow for back and forth washing. In certain embodiments this process will be automated; however, these and other valves can be manual or automatic, according to design choice or the system configuration.

Figure 6:
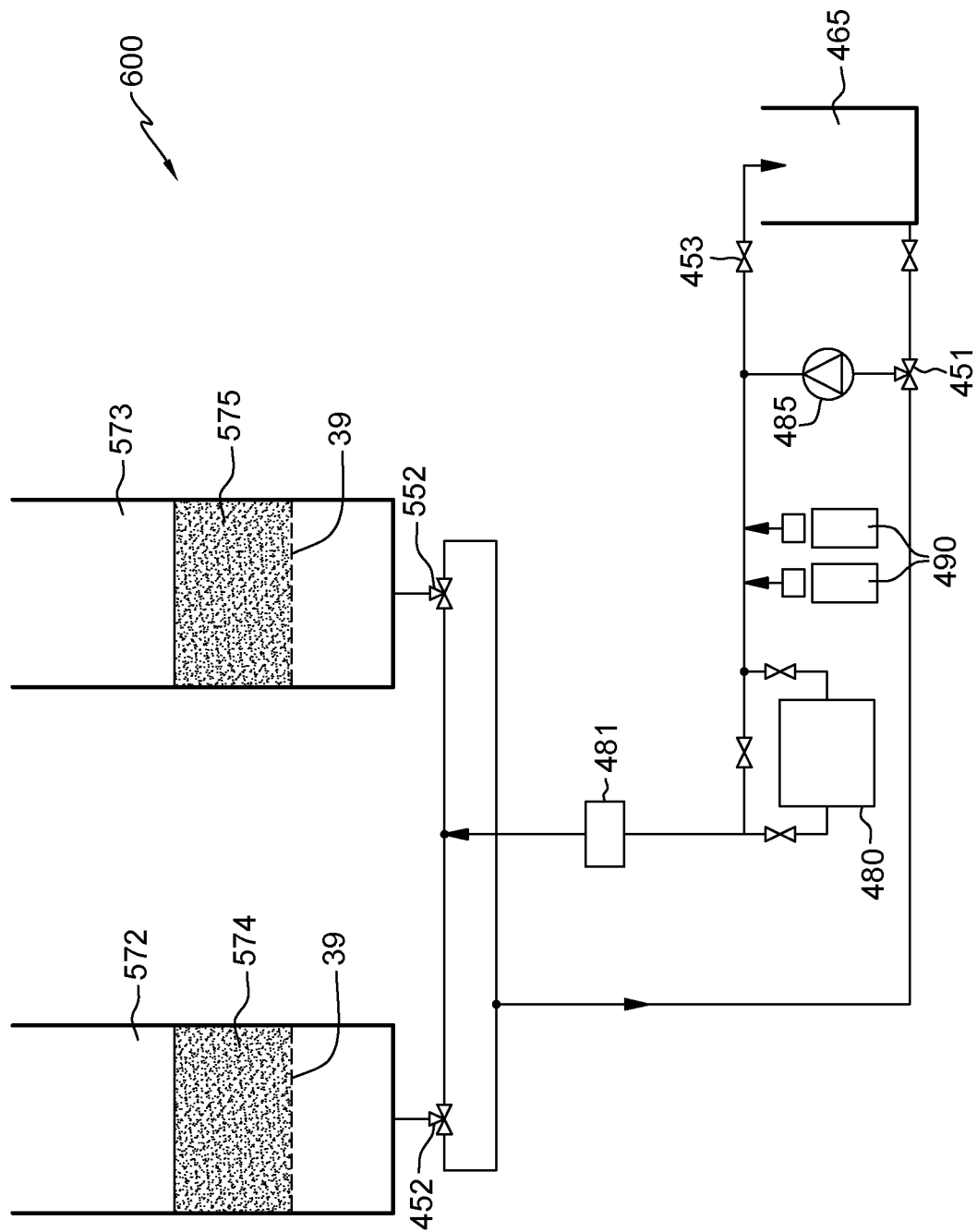
FIG. 6 is an alternate embodiment of a configuration for a washing system for a powdered activated carbon treatment system, wherein the system and method uses dedicated external washer(s).

Although the embodiments disclosed in FIG. 1-5 have described water filtration systems using a granular filter medium such as GAC as the adsorbent material, the novel washing methodology disclosed herein can also be used with water treatment systems that incorporate or utilize a powdered activated carbon (PAC) system as well. Referring to FIG. 6, a schematic representation of an embodiment of a washing system for PAC slurry system 600 in accordance with the invention is shown, which can be utilized to treat spent PAC. In this embodiment, the carbon washing system 600 comprises, among other things, a wash fluid holding tank 465 and one or two external washers 572/573. In practice, the exhausted PAC slurry (574/575) is transferred to the wash tank(s) 572/573, wherein the external washers typically would have a porous plate false bottom 39 to separate the PAC powder from the wash fluid as it is drawn down from the washer. In this embodiment, the back-and-forth wash system will use lower wash fluid flow rates and longer cycle times. For example, although not meant to be limiting, the wash sequence will have a draw down flow rate (downward) and fluidization flow rate (upward) typically in the range of about 1 to about 10 m/h (e.g. 1, 2, 3, 5, 6, 7, 8, 9, 10 m/h), including any and all ranges and subranges therein (e.g. 1-10, 2-10, 3-10, 5-10, 1-5, 1-6, 2-5, 2-8, 4-5, 5-6, 5-8, 5-10, 7-10, 9-10 m/h).

In embodiments utilizing these flow rates, the washing step for each cycle in each flow direction will have a duration of about 30 minutes, or in the range of about 5 to 300 minutes (e.g. 5, 6, 7, 8, 9, 10, 15, 20, 21, 25, 30, 31, 33, 35, 40, 50, 55, 60, 100, 200, 300 minutes), including any and all ranges and subranges therein (e.g. 5-6, 5-10, 5-20, 5-30, 5-50, 5-60, 5-200, 10-15, 10-20, 10-30, 15-20, 15-30, 15-40, 20-30, 25-30, 30-35, 30-40, 30-60 minutes).

The wash system and process in this embodiment, including the external washer, is essentially the same as the sequence described for washing a pair of filters (see, e.g. FIG. 5), however in the embodiment shown in FIG. 6 for a PAC system, stronger chemicals may be used. Furthermore, in accordance with the invention, dissolved ozone should not be used in the external washers 572/573 when the wash fluid contains flammable solvents, caustic soda or surfactants that tend to foam.

Figure 7:
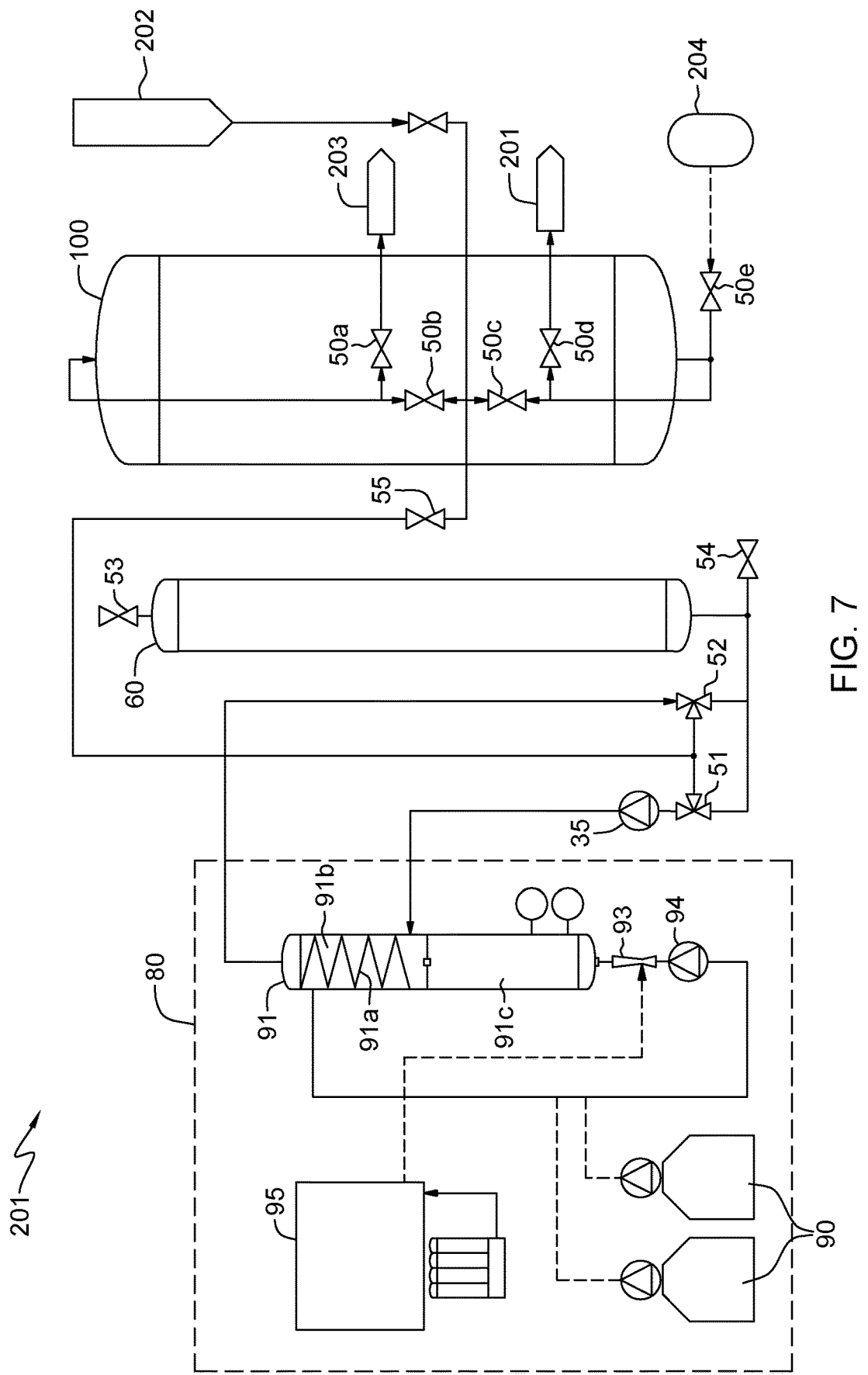
FIG. 7 illustrates an alternate embodiment wherein an ozone dissolution tank is utilized in accordance with certain embodiments described herein, wherein the ozone dissolution tank generates ozone microbubbles in the wash fluid during the back-and-forth wash cycles.

In embodiments of the invention, gaseous ozone can be introduced or mixed directly into the wash water to spontaneously produce dissolved ozone in the wash fluid immediately before introduction to the filter bed. Alternatively, and referring to FIG. 7, in certain embodiments (although not required), ozone dissolution device 80 comprises a novel ozone dissolution tank 91 (or "Ozone Contact Tank 91"). Ozone contact tank 91 is employed to produce dissolved ozone, more specifically an ozone-microbubbled solution.

In embodiments disclosed herein, ozone dissolution tank 91 is designed to promote the formation of ozone microbubbles, which are slow to come out of suspension in the ozonated water. The formation of ozone microbubbles serves two functions. First, it assists in assuring that the dissolved ozone in the wash fluid or treatment solution reaches all points in the underdrain system of large municipal filters. Second, the formation and presence of ozone microbubbles in the wash fluid allows the ozone to reach deeper (or further) into a static carbon filtration bed, where dissolved ozone is quickly extinguished as it reacts with the carbon granules. As disclosed herein, by using ozone contact tank 91, ozone initially is disposed within the microbubbles as well as dissolved in the wash fluid. As the ozonated wash fluid travels through the filter bed, the ozone in the microbubbles gradually dissolves into the water, and the dissolved ozone within the wash fluid will then deplete at a more gradual rate, thereby allowing the ozone to reach deeper into the filter bed before reacting with the carbon and disappearing.

In certain embodiments, ozone dissolution tank 91 has two chambers, and three distinct pressure regimes, designed to supersaturate the water with ozone in the high pressure regime, and form the microbubbles in the low-pressure regime where the solubility is less. Water enters the upper, low-pressure chamber 91a, where it mixes with ozone supersaturated water, flows upward through a static mixer 91b. Shear forces in the mixer promote the formation of microbubbles with significantly less pressure differential than otherwise required. The pressure in this upper chamber 91a is determined hydraulically by the piping system, water levels and the filter being washed, but is generally about 1 bar (15 psi).

Water exits from the top of dissolution tank 91 after passing through the static mixer 91b. Part of the flow is drawn from the top of the contact tank 91 via the ozone injection pump 94, which boosts the pressure to about 10 bar (150 psi), then passes through the venturi 93 which aspirates the ozone. Pressure between the venturi outlet and orifice at the bottom of contact tank 91 is about 6 bar (90 psi), and in this pressure regime most of the ozone supersaturation occurs.

The lower or bottom chamber of the tank 91c constitutes the mid-pressure regime, at about 4 bar (60 psi), where dissolved ozone is increased, given a contact time in the range of 15 to 90 seconds. At the top of the lower or bottom chamber 91c, the water with supersaturated ozone passes through an orifice, where pressure is dropped to about 1 bar (15 psi) and is mixed with the water entering the tank.

Although the disclosed configuration and design for a novel dissolution tank 91 to form ozone microbubbles is disclosed herein, one of ordinary skill in the art will recognize that alternate methods of producing dissolved ozone and/or other treatment chemicals (oxidizing and non-oxidizing) may be used. The regeneration and/or sanitization technique described herein is not limited to the described exemplary embodiments of the dissolution tank 91 shown in FIG. 7 for producing ozone microbubbles, but can also be employed with other methods or devices for generating dissolved oxidant or cleaning chemicals, either at the point of entry or in a separate feed tank.

EXAMPLES

A pilot plant was constructed using two 8-inch (20 cm) diameter filter columns, by 10-foot (3 m) high, packed with 40 inches (1 m) of activated carbon and equipped with a pump and automatic valves to prove the practicality and claims of the present patent application. Each column has 1.15 cubic feet (32.4) liters, with a weight of 35 pounds (16 kg). The pilot plant was installed to treat the discharge of a sewage treatment plant at a university. To verify the feasibility of back-and-forth washing without clogging the underdrain (and in the absence of an automatic cleaning system/device), these filters were operated continuously for 2 hours with and without gravel covering the nozzles and supporting the activated carbon. In both cases the initial water flows were maintained over the 2-hour test.

NaOH Wash Solution: In situ regeneration was tested using back-and-forth flow as follows: Twin 8 inch diameter filters of a pilot plant were loaded to a 1.5 meter depth with bituminous granular activated carbon having an initial iodine number of 966. After 3 months in service the iodine number had dropped to 772, 80% of its original adsorption capacity. A 1% wash solution of 26 gallons (100 liters) containing 2.2 pounds (1 kg) of caustic soda (NaOH) was prepared. The carbon was back-and-forth washed for two (2) hours with the NaOH solution at 35° C. while gaseous ozone was introduced at the inlet to each filter for a total applied dose of 100 mg ozone per kg of dry carbon, then drained and rinsed to remove residual NaOH. The iodine number was found to have recovered to 893, 92% of its original adsorption capacity.

Total water consumption in this wash sequence was about 5 bed volumes that was used for the prepared wash fluid and the final rinse. By comparison, to achieve the same washing effect with backwashing (instead of back and forth washing) would have required 29 bed volumes of wash water to be used for backwashing and the final rinse, and 19 pounds (8.6 kg) of caustic soda.

Dissolved Ozone: The effectiveness of in situ regeneration and/or sanitization using dissolved ozone were tested in industrial activated carbon filters used to dechlorinate potable water, without using the back-and-forth flow method described herein (see U.S. Pat. No. 9,375,663). Without ozone backwash, these filters frequently exceeded the acceptable level of bacteria counts in normal operation, despite weekly steaming. However, by using ozonated backwash, bacteria counts were brought down to around the acceptable level and the adsorptive capacity as measured by iodine number was increased from 63% to 87% of the value for virgin carbon. Specifically, in this case, three filters, each containing 120 cu ft (3400 liters) of bituminous activated carbon, were backwashed for 15 minutes daily with water containing 0.8 mg/l of dissolved ozone. While it was discovered that longer wash times would further reduce bacteria counts, the water consumption required for longer wash times is too large. By using the methods disclosed herein, the beneficial aspects of applying ozone during the backwash steps are achieved with minimum water consumption.

Bench Scale Test for Disinfection of Cationic Resin: To test the effectiveness in disinfection by ozone of a cationic ion exchange resin, a sample was taken from a water softener with 10 years in service, treating unchlorinated hard water. The sample was inspected for physical integrity of the resin beads, before and after treating the sample with ozone. No visible damage was found after ozonation, confirming reports in the literature that cationic exchange resin is resistant to oxidation. 100 mL (118 g drained) of resin was washed with 200 mL/min of ozonized water containing 1.1 mg/L of dissolved ozone for 60 minutes, while agitating with a magnetic stirrer at 265 rpm to keep the resin fluidized. Samples from before and after ozone treatment were analyzed to determine the bacterial content (heterotrophic plate count). Results were as follows:

| Effective wash time minutes) | Bacterial count (cfu/mL) |
| --- | --- |
| 0 | 130 |
| 60 | 1 |

Pilot Plant—Disinfection by Ozone: To test the effectiveness of disinfection with ozone of activated carbon using the back and forth method disclosed herein, a pilot filter containing a 1.5-meter depth of bacteria-laden granular activated carbon was configured for back and forth washing. Specifically, the back and forth washing system was configured to have an effective total wash time of 80 minutes, with upward flow of 15.5 m/h of water containing 0.65 mg/L of dissolved ozone and 35 m/h of air to assist fluidization of the filter bed.

Throughout the washing process, samples of the carbon were withdrawn at intervals to determine the remaining bacterial load. For each sample, 2 g of drained carbon (1g dry weight) were added to 100 mL of pure water and pulverized in a blender at high speed for 5 minutes. The samples were then analyzed to determine the bacterial content (heterotrophic plate count). Results were as follows:

| Effective wash time (minutes) | Bacterial count (cfu/mL) |
| --- | --- |
| 0 | 540 |
| 5 | 260 |
| 10 | 0 |
| 20 | 0 |
| 40 | 0 |
| 80 | 0 |

Based on the above results, it is concluded that any of the chemical sanitization and regeneration techniques known in the art can be successfully applied with back and forth wash flow, provided construction materials of the vessels and piping are compatible and suitable safety precautions followed.

CLAUSES

1. A method for washing an adsorptive medium within a water treatment system, comprising the steps of:
   (a) providing a first and a second vessel, wherein said first vessel is configured to contain the adsorptive medium to be regenerated, and wherein the second vessel is in fluid communication with the first vessel; and
   (b) performing a washing stage with a wash fluid by cycling a flow of the wash fluid between the first and second vessel in a first and second flow direction to produce a back-and-forth flow of the wash fluid through the adsorptive medium, wherein the back-and-forth flow of the wash fluid between the first and second vessel is performed for a sufficient number of cycles and a time period sufficient to at least partially regenerate the adsorptive medium, thereby producing a processed wash fluid; and
   (c) stopping the back-and-forth flow of the processed wash fluid between the first and second vessel; and
   (d) performing a step selected from the group comprising draining the processed wash fluid from the first vessel, draining the processed wash fluid from the second vessel, flushing the first vessel, flushing the second vessel, discharging the processed wash fluid to waste, neutralizing the processed wash fluid, treating the processed wash fluid to generate at least one additional wash fluid for reuse, rinsing the adsorptive medium, returning to filtration flow, and combinations thereof.

2. The method according to clause 1, wherein the sufficient number of cycles with the washing stage is at least 1.

3. The method according to one of clauses 1-2 further comprising the step of performing one or more additional washing stages with at least one additional wash fluid, wherein the one or more additional washing stages comprise The method according to one of claims the set of steps (b) to (d) to at least partially regenerate the adsorptive medium, thereby producing at least one additional processed wash fluid.

4. The method according to one of clauses 1-3, wherein the adsorptive medium is substantially regenerated, sanitized, or disinfected.

5. The method according to one of clauses 1-4, wherein the at least one wash fluid comprises at least one treatment chemical, said treatment chemicals being selected from the group comprising water with dissolved ozone, ozone microbubbles, water saturated with dissolved ozone, carbon dioxide solution, saturated carbon dioxide solution, sulfur dioxide solution, saturated sulfur dioxide solution, chlorine dioxide solution, saturated chlorine dioxide solution, acidic solution, alkaline solution, hydrogen peroxide, hydrogen chloride, sodium hydroxide solution, solvents, surfactants, and combinations thereof.

6. The method according to one of clauses 1-5 wherein the water filtration system comprises a filter element comprised of at least one filter bed of adsorptive medium with a filtration flow therethrough, and is configured to form a first filter bed within at least the lower portion of the first vessel, said filter bed comprising an upper surface and a lower surface and configured for filtration of contaminated water through the filter bed and periodic washing thereof, and further comprising the additional step of periodically stopping the filtration flow of contaminated water through the filter element prior to step (a).

7. The method according to one of clauses 1-6 wherein the second vessel is configured as a holding tank.

8. The method according to one of clauses 1-7 wherein the first flow direction of the wash fluid into the first filter bed is opposite to filtration flow through the first filter bed and comprises a first wash flow rate sufficient to at least partially fluidize the adsorptive medium.

9. The method according to one of clauses 1-6, or 8 wherein the second vessel comprises adsorptive medium supported in the lower portion thereof and is configured as a second filter bed in fluid communication with the first filter bed.

10. The method according to clause 9 wherein the second flow direction of the wash fluid into the second filter bed is opposite to filtration flow through the second filter bed and comprises a second wash flow rate sufficient to at least partially fluidize the adsorptive medium.

11. The method according to one of clauses 1-10 further comprising the step of pulsed fluidization configured to renew the bottom portion of a filter bed to be treated, the top portion of the filter bed to be treated, or both the top and bottom portions of the filter bed to be treated.

12. The method according to clause 11 further comprising the steps of:
   (a) performing a pulsed wash sequence, said pulsed wash sequence comprising the steps of periodically pulsing the flow of the wash fluid into the filter bed to be treated at a predetermined minimum fluidization velocity to homogenize the adsorptive medium; introducing ozone or a dissolved ozone solution into the filter bed to be treated; and contacting the adsorptive medium with the ozone or dissolved ozone solution; and
   (b) repeating the pulsing sequence for a predetermined time and number of cycles sufficient to sanitize and/or regenerate substantially all of the adsorptive medium.

13. The method according to one of clauses 11-12 further comprising a chemical injection header operatively submerged in the first filter bed, second filter bed, and combinations thereof, and configured to feed oxidizing treatment chemicals into the filter element, thereby exposing the adsorptive medium substantially above or below the chemical injection header to the treatment chemicals during back-and-forth flow.

14. The method according to ono of clauses 11-13, further comprising the step of feeding air through the filter element in intermittent pulses of short duration in a flow direction opposite to filtration flow and flow rate sufficient to fluidize the adsorptive medium.

15. The method according to one of clauses 1-7 wherein the second vessel is a hydro-pneumatic tank configured to provide fluid flow through the first filter bed.

16. The method according to one of clauses 1-15, wherein the adsorptive medium comprises a porous filter medium.

17. The method according to one of clauses 1-16, wherein the adsorptive medium comprises granular activated carbon.

18. The method according to one of clauses 1-5 wherein the first and second vessel are configured as external washing tanks.

19. The method according to one of clauses 1-5, or 18, wherein the adsorptive medium comprises powdered activated carbon.

20. The method according to one of clauses 1-19 further comprising the step of generating a wash fluid comprising ozone microbubbles with an ozone contact tank comprising a first and second chamber and a high pressure injection means,
   wherein the first chamber is an upper chamber at low pressure and the second chamber is a lower chamber at a pressure higher than the upper chamber and lower than the high pressure injection means, and wherein said upper chamber comprises a static mixer configured to form ozone microbubbles.

21. A water treatment system comprising a first and a second vessel, wherein said first vessel is configured to contain an adsorptive medium to be regenerated, and wherein the second vessel is in fluid communication with the first vessel; and wherein the system is configured to perform a washing stage with a wash fluid by cycling a flow of the wash fluid between the first and second vessel in a first and second flow direction to produce a back-and-forth flow of the wash fluid through the adsorptive medium, and is further configured to provide for the back-and-forth flow of the wash fluid between the first and second vessel to continue for a sufficient number of cycles and a time period sufficient to at least partially regenerate the adsorptive medium.

22. A water treatment system of clause 21, wherein the water filtration system comprises a filter element comprised of at least one filter bed of adsorptive medium with a filtration flow there through, and is configured to form a first filter bed within at least the lower portion of the first vessel, said filter bed comprising an upper surface and a lower surface and configured for filtration of contaminated water through the filter bed and periodic washing thereof.

23. The water treatment system according to clause 22 further comprising a second filter bed.

24. The water treatment system according to clause 23 further comprising a chemical injection header operatively submerged in the first filter bed, second filter bed, and combinations thereof, and configured to feed oxidizing treatment chemicals into the filter element, thereby exposing the adsorptive medium substantially above or below the chemical injection header to the treatment chemicals during back-and-forth flow.

25. The water treatment system according to any one of clauses 21-24, wherein the adsorptive medium comprises granular activated carbon.

26. The water treatment system of clause 21, wherein the first and second vessel are configured as external washing tanks, and the adsorptive medium comprises powdered activated carbon.

27. The water treatment system according to any one of clauses 21-26, further comprising control means to reverse the flow between the first and second vessels, a heater, at least one external holding tank, at least one chemical feed, an ozone contact tank, a wash pump, and combinations thereof.

As described herein, the regeneration and/or sanitization technique of the present invention is not limited to the described exemplary embodiments of a GAC or PAC filter, but can also be employed in the case of other porous medium adsorbers/absorbents. Furthermore, it is not limited to beds through which the flow of the treated liquid, during operation of the filter, occurs from the top towards the bottom. Instead, the technique can also be employed with filters through which the liquid flows in the upward or radial direction.

Similarly, the method is not limited to the specific configurations illustrated herein for the ozone generator, chemical feed pumps, controls, valves, pumps, etc. By way of example only, in regards to the application of ozone in the wash fluid/solution, embodiments of the invention include other forms of ozone generation in accordance with the current state of the art. By way of example only, in certain embodiments liquid ozone could be stored in cryogenic tanks and pass through evaporators to be dosed in the water as pure gaseous ozone. Similarly, provided the requisite ozone doses, whether measured as ozone (wt)/filter media (wt) or alternatively as Concentration-Time (CT) values, are achieved, other manners of generating, mixing, introducing or supplying the dissolved ozone (and/or gaseous ozone directly into the wash water at the point of entry) are contemplated to be within the scope of this disclosure. The same can be said of other chemicals used in the wash fluid.

In biologically active filters, microbial growth in the filter media serves to digest part of the organic contaminant loading, which helps to maintain the adsorptive capacity of the activated carbon. In other applications, bacterial growth in the media constitutes a problem because the bacteria can be carried over into the filtered water. In embodiments of the invention disclosed herein, by judicious control of the wash fluid operating parameters, the desired regeneration can be achieved while permitting the beneficial microbial growth, or sanitization of the filter media can be achieved when microbial growth is problematic.

In certain embodiments, the system and method steps of the invention can be carried out in combination with, and in operational configuration, with primary filtration devices or other conventional water treatment methods, systems and devices. For example, fixed bed adsorption filters may be used in combination (i.e. in sequence) with a primary filtration bed. Furthermore, in certain embodiments, the method steps of the invention can be carried out in addition to conventional backwashing operations, and said inventive steps can take place either before, during or after said conventional backwashing operation.

The source of the feed water to be treated in accordance with this method is not critical. More specifically, the source may be ground water, industrial waste water streams, municipal waste water or sewage treatment effluents, surface water, potable drinking water, etc. However, the methods disclosed herein may be more beneficial for use in municipal potable water treatment versus industrial waste water treatment, which has higher levels of carbon loadings, heavy metals and hazardous contaminants. In particular, the method provides an in situ economical solution for small-scale water treatment systems in rural areas, where off-site regeneration facilities are far away, and/or other known techniques are not logistically feasible and/or affordable. The method is well-suited to be implemented on site, does not require spent carbon to be transported to a specialized facility for regeneration, requires minimum water consumption, can be used without shutting down the entire water treatment system (where multiple filters are employed), and avoids the need for steam sanitization and its high energy consumption and waste. The method disclosed herein also has produced unexpected results in that past attempts to use ozone and/or other treatment chemicals to regenerate and/or sanitize spent carbon in situ have required large amounts of backwash water and/or feed chemicals, thus making it inefficient and cost preclusive.

Prior to the novel method and system disclosed herein, to reduce the consumption of water used during the regeneration and/or sanitization of carbon filter beds using ozone, attempts were made to recirculate backwash effluent exiting from the top of a filter back to the bottom of the filter. As discussed above, however, the nozzles of filter underdrains are designed to block the exit of media particles from the filter during filtration flow (i.e. downward flow direction in a gravity flow filter). As such, when the flow direction is reversed for the backwash stage, fine particles of the filter media exit with the backwash effluent at the top of the filter. In the absence of a cleaning system, when this backwash effluent with high particle content is recirculated back to the bottom of the filter, the underdrain nozzles are very quickly clogged by the fine particles re-entering from the bottom of the filter in the backwash flow direction. Alternate attempts to filter these fine media particles from the backwash effluent were unsuccessful as well because the external particle filter clogged just as quickly.

To solve this problem without the use of an external and/or automatic cleaning system, in the method disclosed herein only wash fluid that has been strained by an underdrain system, flowing in the intended filtration flow direction, is used to flow back and forth through a filter (or filter element) or between a pair of filters. More specifically, by utilizing back-and-forth washing, the wash fluid used to regenerate and/or sanitize the filter media reaches the underdrain nozzles only after flowing through the media bed and, as such, the wash fluid carries less fines than backwash effluent that typically would exit from the filter (and either go to drain or be recirculated to the front of the treatment train). By using back-and-forth flow, each flow reversal flushes out the particle fines that would otherwise be trapped in the underdrain nozzles, thus allowing for the efficient re-use of the wash solution/fluid.

In addition to the above, the invention disclosed herein is novel and beneficial in many other ways, even when clogging is not an issue. For example, as disclosed and discovered herein, water and chemical consumption can be significantly reduced by implementing back-and-forth flow of a wash fluid. Furthermore, following the wash sequence, because a significantly reduced volume of wash fluid is required and consumed, the concentrated contaminants in the reduced volume of spent (i.e. processed) wash fluid can be more readily batch-treated and disposed, or the chemicals recycled, with relative ease.

Furthermore, in systems using air scour, the methods disclosed herein can be applied without any loss of carbon fines. In contrast, in a normal backwash system with continuous overflow, the up flow of wash water with aeration/ozonation will result in excessive media loss.

In still further embodiments, one way to reduce the wash water and chemical consumption, while avoiding the problem of clogging, is to recirculate backwash water through an automatic self-cleaning particulate filter. While not the preferred embodiment, due to the high cost of such a filter large enough to function adequately and the discharge of water required for self-cleaning, the present invention contemplates this as one possible embodiment.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), "contain" (and any form contain, such as "contains" and "containing"), and any other grammatical variant thereof, are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

As used herein, the terms "comprising," "has," "including," "containing," and other grammatical variants thereof encompass the terms "consisting of" and "consisting essentially of."

The phrase "consisting essentially of" or grammatical variants thereof when used herein are to be taken as specifying the stated features, integers, steps or components but do not preclude the addition of one or more additional features, integers, steps, components or groups thereof but only if the additional features, integers, steps, components or groups thereof do not materially alter the basic and novel characteristics of the claimed composition, device or method.

All publications/references cited in this specification are herein incorporated by reference as if each individual publication were specifically and individually indicated to be incorporated by reference herein as though fully set forth.

Subject matter incorporated by reference is not considered to be an alternative to any claim limitations, unless otherwise explicitly indicated.

Where one or more ranges are referred to throughout this specification, each range is intended to be a shorthand format for presenting information, where the range is understood to encompass each discrete point within the range as if the same were fully set forth herein.

While several aspects and embodiments of the present invention have been described and depicted herein, alternative aspects and embodiments may be affected by those skilled in the art to accomplish the same objectives. Accordingly, this disclosure and the appended claims are intended to cover all such further and alternative aspects and embodiments as fall within the true spirit and scope of the invention.

The invention claimed is:

1. A method for washing an adsorptive medium within a water treatment system, wherein the water treatment system comprises a first and a second vessel, the first vessel having an underdrain assembly,
and wherein the first vessel is configured to contain at least one adsorptive medium and to perform a fluid filtration step of a fluid in a filtration flow direction and the second vessel is in fluid communication with the first vessel, wherein the fluid to be filtered comprises water;
said method comprising the steps of:
filtering the fluid;
stopping the filtration step and draining the fluid from the first vessel in a draw down direction that is substantially the same as the filtration flow direction; and
performing at least one washing stage with at least one wash fluid, the at least one washing stage comprising the steps of
(a) performing a back-and-forth flow cycle comprising
(i) drawing the at least one wash fluid from the second vessel to the first vessel in a first wash step for a duration sufficient to at least substantially fill the first vessel with the at least one wash fluid, wherein the wash fluid flows to the first vessel through the underdrain assembly and in a direction opposite to the filtration flow direction; and
(iii) drawing the at least one wash fluid from the first vessel through the underdrain assembly to the second vessel in a second wash step in a direction substantially the same as the filtration flow direction;
(b) repeating the back-and-forth flow cycle of step (a) to produce a continuous back-and-forth flow of the at least one wash fluid through the adsorptive medium, wherein the continuous back-and-forth flow comprises a plurality of back-and-forth flow cycles sufficient to at least partially regenerate the adsorptive medium, thereby producing a processed wash fluid; and
(c) stopping the back-and-forth flow cycle of step (a).

2. The method according to claim 1 wherein the number of back-and-forth flow cycles is between 10 and 200.

3. The method according to claim 1 further comprising the step of performing one or more additional washing stages with at least one additional wash fluid, wherein the one or more additional washing stages comprise repeating the set of steps (a) to (c), thereby producing at least one additional processed wash fluid.

4. The method according to claim 3 wherein the number of washing stages is between 1 and 6.

5. The method according to claim 1, wherein the at least one wash fluid comprises at least one treatment chemical, said treatment chemical being selected from the group consisting of water with dissolved ozone, ozone microbubbles, water saturated with dissolved ozone, carbon dioxide solution, saturated carbon dioxide solution, sulfur dioxide solution, saturated sulfur dioxide solution, chlorine dioxide solution, saturated chlorine dioxide solution, acidic solution, alkaline solution, hydrogen peroxide, hydrogen chloride, sodium hydroxide solution, solvents, surfactants, and combinations thereof.

6. The method according to claim 1 wherein the second vessel is configured as a holding tank.

7. The method according to claim 1 wherein the second vessel is a hydro-pneumatic tank configured to provide fluid flow through the adsorptive medium.

8. The method according to claim 1 wherein the first wash step has a first wash flow rate of between about 15-50 m/h and is sufficient to at least partially fluidize the adsorptive medium.

9. The method according to claim 1 further comprising a pulsed fluidization step to renew a bottom portion of a filter bed to be treated, a top portion of the filter bed to be treated, or both the top and bottom portions of the filter bed to be treated, and comprising the steps of
   a. performing a pulsed wash sequence by (i) periodically pulsing the first or second wash flow of the wash fluid into the filter bed to be treated at a predetermined minimum fluidization velocity to homogenize the adsorptive medium; and (ii) introducing ozone or a dissolved ozone solution into the filter bed to be treated, thereby contacting the adsorptive medium with the ozone or dissolved ozone solution; and
   b. repeating the pulsed wash sequence step (a) for a predetermined time and number of cycles sufficient to sanitize and/or regenerate substantially all of the adsorptive medium.

10. The method according to claim 9 wherein the water treatment system further comprises a chemical injection header operatively submerged in the filter bed and configured to feed oxidizing treatment chemicals into the adsorptive medium, the method further comprising exposing the adsorptive medium substantially above or below the chemical injection header to the treatment chemicals during the continuous back-and-forth flow.

11. The method according to claim 9, further comprising the step of feeding air through the adsorptive medium in intermittent pulses of short duration in a flow direction opposite to filtration flow and at a flow rate sufficient to fluidize the adsorptive medium.

12. The method according to claim 1, wherein the adsorptive medium comprises granular activated carbon.

13. The method according to claim 1 further comprising the step of generating a wash fluid comprising ozone microbubbles with an ozone contact tank comprising a first and second chamber and a high pressure injection means, wherein the first chamber is an upper chamber at low pressure and the second chamber is a lower chamber at a pressure higher than the upper chamber and lower than the high pressure injection means, and wherein said upper chamber comprises a static mixer configured to form ozone microbubbles.

14. A method for washing an adsorptive medium within a water treatment system, wherein the water treatment system comprises a first and a second vessel, the first vessel having an underdrain assembly, and wherein the first vessel is configured to contain at least one adsorptive medium and the second vessel is in fluid communication with the first vessel;
said method comprising the steps of:
performing at least one washing stage with at least one wash fluid, the at least one washing stage comprising the steps of
   (a) performing a back-and-forth flow cycle comprising
       (i) drawing the at least one wash fluid from the second vessel to the first vessel in a first wash step for a duration sufficient to at least substantially fill the first vessel with the at least one wash fluid, wherein the wash fluid flows to the first vessel through the underdrain assembly and in a direction opposite to the filtration flow direction; and
       (iii) drawing the at least one wash fluid from the first vessel through the underdrain assembly to the second vessel in a second wash step in a direction substantially the same as the filtration flow direction;
   (b) repeating the back-and-forth flow cycle of step (a) to produce a continuous back-and-forth flow of the at least one wash fluid through the adsorptive medium, wherein the continuous back-and-forth flow comprises a plurality of back-and-forth flow cycles sufficient to at least partially regenerate the adsorptive medium, thereby producing a processed wash fluid; and
   (c) stopping the back-and-forth flow cycle of step (a).

15. The method according to claim 14 wherein the second vessel is configured as a holding tank.

16. The method according to claim 14 wherein the adsorptive medium is selected from the group consisting of granular activated carbon and powdered activated carbon.

17. The method according to claim 14 wherein the number of back-and-forth flow cycles is between 10 and 200.

18. The method according to claim 14 further comprising the step of performing one or more additional washing stages with at least one additional wash fluid, wherein the one or more additional washing stages comprise repeating the set of steps (a) to (c), thereby producing at least one additional processed wash fluid.

19. The method according to claim 18 wherein the number of washing stages is between 1 and 6.

20. The method according to claim 14 further comprising a step selected from the group consisting of draining the processed wash fluid from the first vessel to a storage or treatment tank, draining the processed wash fluid from the second vessel to a storage or treatment tank, flushing the first vessel with clean water, flushing the second vessel with clean water, discharging a portion of the processed wash fluid from the water treatment system to an external waste stream, discharging a portion of the processed wash fluid from the water treatment system to an overflow stream, neutralizing the processed wash fluid, treating the processed wash fluid to generate at least one additional wash fluid for reuse, returning to filtration flow, and combinations thereof.

* * * * *